(12) United States Patent
Seki et al.

(10) Patent No.: US 8,108,363 B2
(45) Date of Patent: Jan. 31, 2012

(54) COMPUTER PRODUCT, METHOD, AND APPARATUS FOR ANALYZING COMPUTER SYSTEM

(75) Inventors: Yukiko Seki, Kawasaki (JP); Lilian Harada, Kawasaki (JP); Ken Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1089 days.

(21) Appl. No.: 11/589,885

(22) Filed: Oct. 31, 2006

(65) Prior Publication Data
US 2007/0228149 A1    Oct. 4, 2007

(30) Foreign Application Priority Data
Mar. 31, 2006    (JP) .................................. 2006-099351

(51) Int. Cl.
 G06F 7/00 (2006.01)
 G06F 17/00 (2006.01)
(52) U.S. Cl. ..................................................... 707/688
(58) Field of Classification Search .................... 707/688
 See application file for complete search history.

(56) References Cited

FOREIGN PATENT DOCUMENTS
JP    2006-011683    1/2006

OTHER PUBLICATIONS

Srivastava et al., "Web usage mining: discovery and applications of usage patterns from Web data", ACM SIGKDD Explorations Newsletter, vol. 1 , Issue 2, pp. 12-23, Jan. 2000, ACM.*
Cormode et al., "The String Edit Distance Matching Problem With Moves", Proceedings of the thirteenth annual ACM-SIAM symposium on Discrete algorithms, 2002, ACM.*

* cited by examiner

*Primary Examiner* — Michael Hicks
(74) *Attorney, Agent, or Firm* — Fujitsu Patent Center

(57) ABSTRACT

A system analyzing apparatus analyzes a processing state of a computer system that includes a plurality of types of unit processing. The system analyzing apparatus includes a selecting unit that selects a plurality of representative unit processing based on similarities between individual units of the unit processing; and a grouping unit that groups each unit processing based on similarity between the each unit processing and each of representative unit processing selected by the selecting unit.

16 Claims, 35 Drawing Sheets

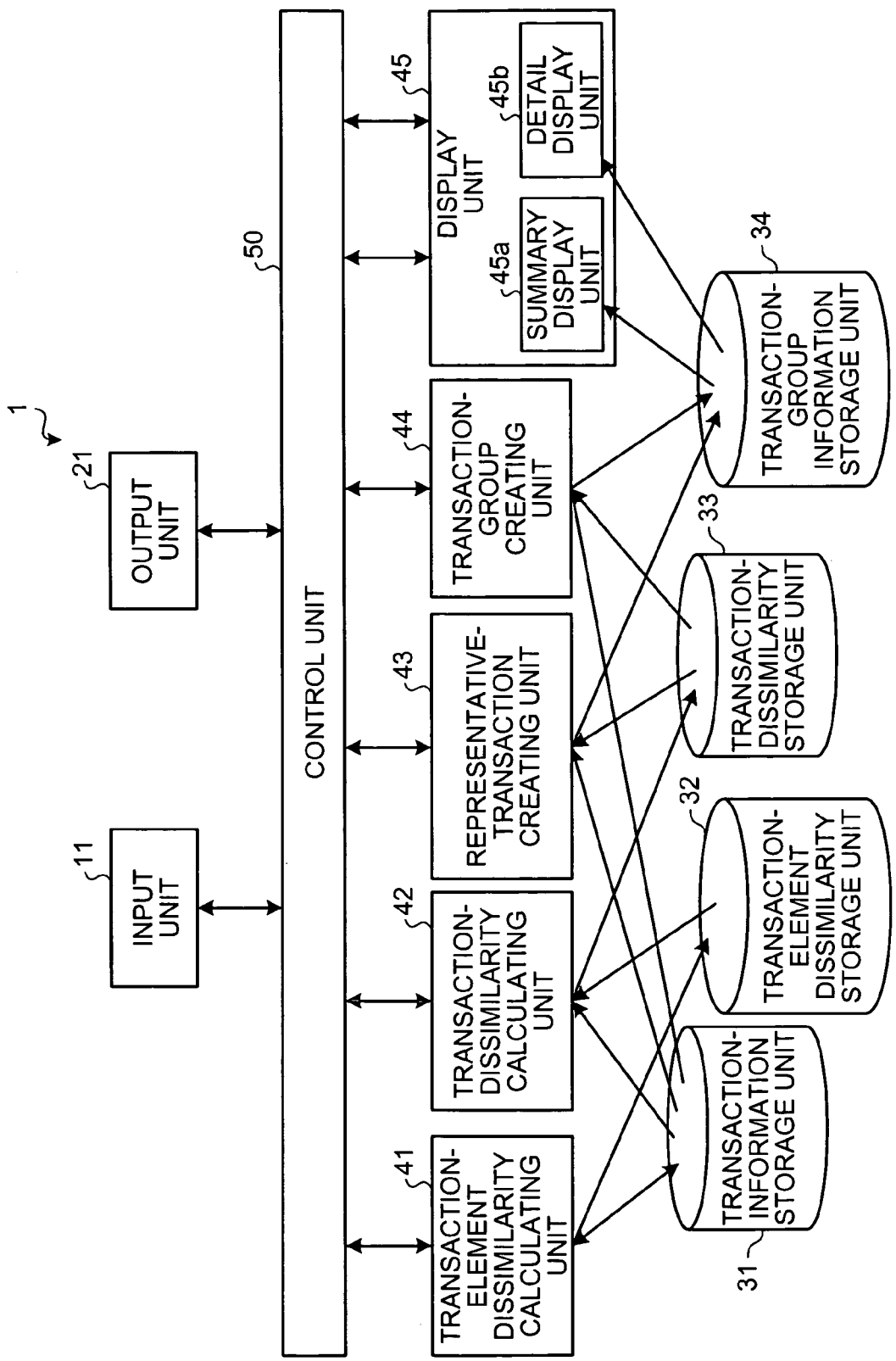

FIG.2

| TRANSACTION TYPE ID, TRANSACTION STRUCTURE AND ELEMENTS (OBJECT DESCRIPTION), APPEARANCE FREQUENCY |
|---|
| m1,0;HTTP;"/bin/program1.cgi?x="\|0-0;IIOP;"M0123"\|0-0-0;DB;"Open A"\|0-0-1;DB;"Fetch A"\|0-0-2;DB;"Close A",1000 |
| m2,0;HTTP;"/bin/program2a.cgi?y="\|0-0;IIOP;"M0145"\|0-0-0;DB;"Open B"\|0-0-1;DB;"Fetch B"\|0-0-2;DB;"Close B",800 |
| m3,0;HTTP;"/bin/program3.cgi"\|0-0;IIOP;"M0300"\|0-0-0;DB;"Open C"\|0-0-1;DB;"Fetch C"\|0-0-2;DB;"Close C",1200 |
| m4,0;HTTP;"/bin/program2a.cgi?y="\|0-0;IIOP;"M0145",20 |
| m5,0;HTTP;"/bin/program1.cgi?x="\|0-0;IIOP;"M0123"\|0-0-0;DB;"Open A"\|0-0-1;DB;"Close A",10 |
| m6,0;HTTP;"/bin/program1-1.cgi?x="\|0-0;IIOP;"M0123"\|0-0-0;DB;"Open A"\|0-0-1;DB;"Fetch A"\|0-0-2;DB;"Close A",80 |
| m7,0;HTTP;"/bin/program3.cgi?x=&y=&z="\|0-0;IIOP;"M0300"\|0-0-0;DB;"Open C"\|0-0-1;DB;"Fetch C"\|0-0-2;DB;"Close C",70 |
| m8,0;HTTP;"/dir/index.html",1500 |
| m9,0;HTTP;"/bin.new/program9.cgi?y="\|0-0;IIOP;"M0200"\|0-0-0;DB;"Open B"\|0-0-1;DB;"Fetch B"\|0-0-2;DB;"Close B",80 |
| m10,0;HTTP;"/bin/program1.cgi?x="\|0-0;IIOP;"M0123"\|0-0-0;DB;"Open A"\|0-0-1;DB;"Fetch A"\|0-0-2;DB;"Fetch A"\|0-0-3;DB;"Close A",50 |
|  |

FIG.4

| TRANSACTION TYPE ID, TRANSACTION STRUCTURE AND ELEMENTS (OBJECT DESCRIPTION), ELEMENTS (SYMBOLIC DESCRIPTION), APPEARANCE FREQUENCY |
|---|
| m1,0;HTTP;"/bin/program1.cgi?x="\|0-0;IIOP;"M0123"\|0-0-0;DB;"Open A"\|0-0-1;DB;"Fetch A"\|0-0-2;DB;"Close A",ABCDE,1000 |
| m2,0;HTTP;"/bin/program2a.cgi?y="\|0-0;IIOP;"M0145"\|0-0-0;DB;"Open B"\|0-0-1;DB;"Fetch B"\|0-0-2;DB;"Close B",GHIJK,800 |
| m3,0;HTTP;"/bin/program3.cgi"\|0-0;IIOP;"M0300"\|0-0-0;DB;"Open C"\|0-0-1;DB;"Fetch C"\|0-0-2;DB;"Close C",NOPQR,1200 |
| m4,0;HTTP;"/bin/program2a.cgi?y="\|0-0;IIOP;"M0145",GH,20 |
| m5,0;HTTP;"/bin/program1.cgi?x="\|0-0;IIOP;"M0123"\|0-0-0;DB;"Open A"\|0-0-1;DB;"Close A",ABCE,10 |
| m6,0;HTTP;"/bin/program1-1.cgi?x="\|0-0;IIOP;"M0123"\|0-0-0;DB;"Open A"\|0-0-1;DB;"Fetch A"\|0-0-2;DB;"Close A",FBCDE,80 |
| m7,0;HTTP;"/bin/program3.cgi?x=&y=&z="\|0-0;IIOP;"M0300"\|0-0-0;DB;"Open C"\|0-0-1;DB;"Fetch C"\|0-0-2;DB;"Close C",SOPQR,70 |
| m8,0;HTTP;"/dir/index.html",T,1500 |
| m9,0;HTTP;"/bin.new/program9.cgi?y="\|0-0;IIOP;"M0200"\|0-0-0;DB;"Open B"\|0-0-1;DB;"Fetch B"\|0-0-2;DB;"Close B",LMIJK,80 |
| m10,0;HTTP;"/bin/program1.cgi?x="\|0-0;IIOP;"M0123"\|0-0-0;DB;"Open A"\|0-0-1;DB;"Fetch A"\|0-0-2;DB;"Fetch A"\|0-0-3;DB;"Close A",ABCDDE,50 |
| |

FIG.5

SYMBOL, PROTOCOL TYPE, "OBJECT", STRING LENGTH

A,HTTP,"/bin/program1.cgi?x=",20
B,IIOP,"M0123",5
C,DB,"OpenA",6
D,DB,"FetchA",7
E,DB,"CloseA",7
F,HTTP,"/bin/program1-1.cgi?x=",22
G,HTTP,"/bin/program2a.cgi?y=",21
H,IIOP,"M0145",5
I,DB,"Open B",6
J,DB,"Fetch B",7
K,DB,"Close B",7
L,HTTP,"/bin.new/program9.cgi?y=",24
M,IIOP,"M0200",5
N,HTTP,"/bin/program3.cgi",17
O,IIOP,"M0300",5
P,DB,"Open C",6
Q,DB,"Fetch C",7
R,DB,"Close C",7
S,HTTP,"/bin/program3.cgi?x=&y=&z=",26
T,HTTP,"/dir/index.html",15

FIG.6

DISSIMILARITY BETWEEN ELEMENTS p AND q, ed(p, q)
p AND q INCLUDING SAME TYPE PROTOCOL=(EDIT DISTANCE BETWEEN p AND q)/(SUM OF STRING LENGTHS)
p AND q INCLUDING DIFFERENT TYPE PROTOCOL=1 (CONSTANT)

INFORMATION OF ELEMENT
SYMBOL, PROTOCOL TYPE, "OBJECT", STRING LENGTH

A , HTTP , "/bin/program1.cgi?x=",20
B , IIOP ; "M0123" , 5
...
G , HTTP ; "/bin/program2a.cgi?y=",21
H , IIOP ; "M0145" , 5

```
ELEMENT p, ELEMENT q, DISSIMILARITY
BETWEEN p AND q
A,A,0
A,B,1
A,C,1
A,D,1
A,E,1
A,F,0.047619
A,G,0.073171
A,H,1
A,I,1
A,J,1
A,K,1
A,L,0.136364
A,M,1
```

DISSIMILARITY OF TRANSACTION t TO TRANSACTION s
td(s, t)=(WEIGHTED EDIT DISTANCE BETWEEN SYMBOLIC DESCRIPTIONS OF s AND t wed (s, t))(APPEARANCE FREQUENCY OF t)
WEIGHT: REPLACING SYMBOL p WITH q=ed(p, q); ADDING SYMBOL p=0.2 (CONSTANT); DELETING SYMBOL p=0.2 (CONSTANT)

TRANSACTION ID, SYMBOLIC DESCRIPTION, APPEARANCE FREQUENCY
m1, ABCDE, 1000

TRANSACTION ID, SYMBOLIC DESCRIPTION, APPEARANCE FREQUENCY
m4, GH, 20

wed (ABCDE, GH) = (REPLACE G WITH A)+(REPLACE H WITH B)+(ADD C, D, AND E)
= 0.0731 + 0.2 + 0.2 * 3 = 0.8731
td(m1, m4) = wed(ABCDE, GH) = 0.8731 * (FREQUENCY OF m4) = 0.8731 * 20 = 17.462
td(m4, m1) = wed(GH, ABCDE) * (FREQUENCY OF m1) = 0.8731 * 1000 = 873.1

FIG.9 mi, mj, wed (SYMBOLIC DESCRIPTION OF mi, SYMBOLIC DESCRIPTION OF mj), FREQUENCY OF mj, td(mi, mj)
m1,m1,0.000,1000,0.000
m1,m2,0.499,800,399.489
m1,m3,0.634,1200,761.158
m1,m4,0.873,20,17.463
m1,m5,0.200,10,2.000
m1,m6,0.047,80,3.809
m1,m7,0.678,70,47.485
m1,m8,1.257,1500,1885.714
m1,m9,0.662,80,53.004
m1,m10,0.200,50,10.000

...
m4,m1,0.873,1000,873.171
m4,m2,0.600,800,480.000
m4,m3,1.031,1200,1237.894
m4,m4,0.00,20,0.000
m4,m5,0.673,10,6.731
m4,m6,0.893,80,71.441
m4,m7,1.070,70,74.914
m4,m8,0.672,1500,1008.333
m4,m9,1.033,80,82.666
m4,m10,1.073,50,53.658

...
m10,m9,0.862,80,69.004
m10,m10,0.000,50,0.000 wed(s, t): WEIGHTED EDIT DISTANCE
BETWEEN SYMBOLIC STRINGS s AND t

FIG.10

SELECT CERTAIN NUMBER OF REPRESENTATIVE TRANSACTIONS FROM AGGREGATION OF TRANSACTIONS BASED ON DISSIMILARITY BETWEEN TRANSACTIONS td (SELECT GROUP OF TRANSACTION SO AS TO MINIMIZE TOTAL SUM, IN TRANSACTION AGGREGATION, OF DISSIMILARITY BETWEEN EACH TRANSACTION AND MOST SIMILAR REPRESENTATIVE TRANSACTION)
td IS WEIGHTED WITH APPEARANCE FREQUENCY OF TRANSACTION, THEREFORE, TRANSACTION THAT APPEARS FREQUENTLY AND IS NOT SIMILAR TO OTHER FREQUENT TRANSACTIONS IS GIVEN PRIORITY TO BE SELECTED AS REPRESENTATIVE TRANSACTION

- m8 [1500]
- m2 [800]
- m4 [20]
- m9 [30]
- m7 [70]
- m3 [1200]
- m10 [50]
- m1 [1000]
- m5 [10]
- m6 [80]

FIG.19
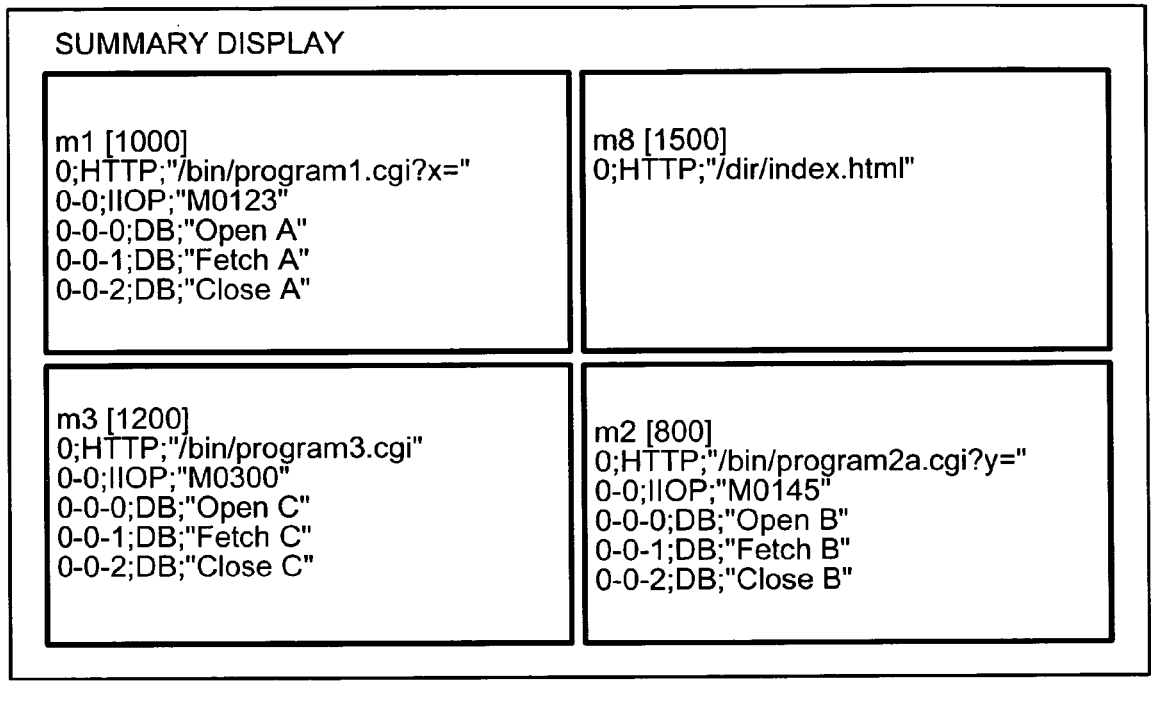
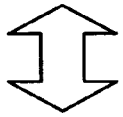
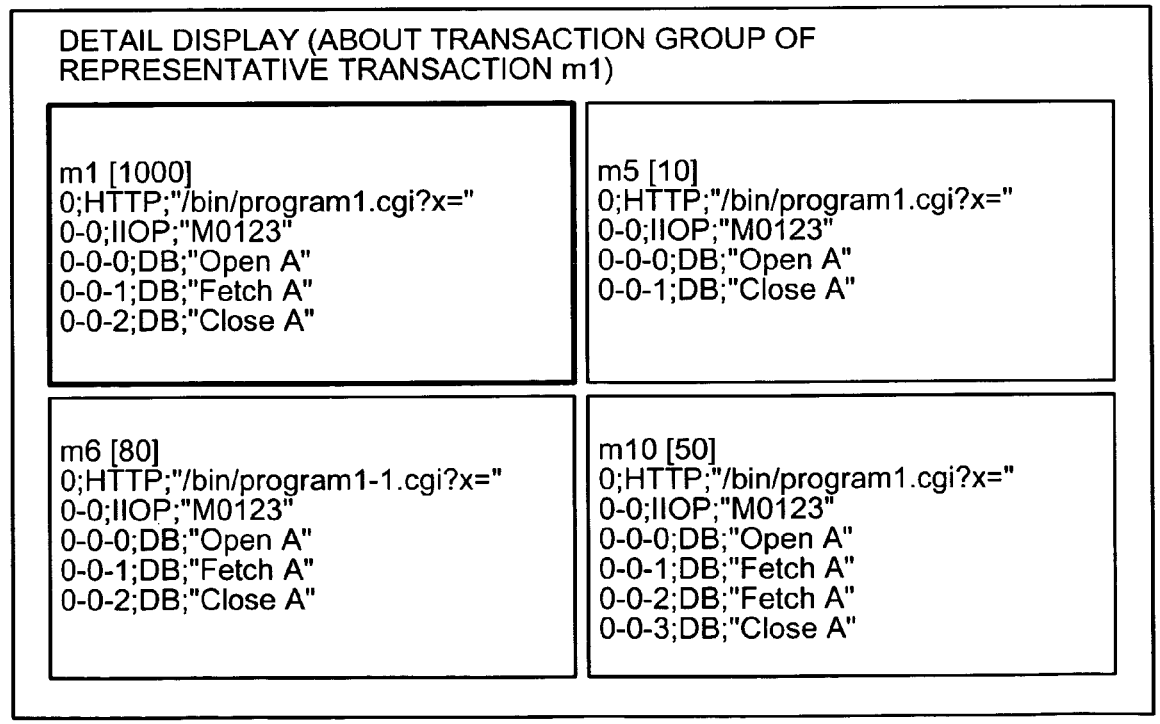

COMPUTER PRODUCT, METHOD, AND APPARATUS FOR ANALYZING COMPUTER SYSTEM

BACKGROUND OF THE INVENTION

1. Field of the Invention

The present invention generally relates to a technology for analyzing a processing state of a computer system. Specifically, the present invention relates to a technology for analyzing a processing state of a computer system that processes a plurality of types of units of processing.

2. Description of the Related Art

Analysis of transactions (flows of service processing) each of which is a unit of processing in a computer system for business is an effective way to analyze, evaluate, and monitor a processing state of the computer system for business. However, because numerous types of transaction patterns are present in a computer system for business, types of transactions available to be analyzed are conventionally limited, and to limit types of transactions, structural elements of transactions need to be manually specified.

Japanese Patent Application Laid-open No. 2006-11683 discloses a technology that collects message logs being communicated on a network for service processing in a Or computer system for business subjected to analysis, and estimates transactions based on calling-relation between messages in logs. By using such technology, numerous types of transactions, even infrequent transactions, present in the computer system for business can be extracted without manual operations.

However, it is a large workload that structural elements of transactions subjected-to analysis are manually specified. Moreover, according to a method disclosed in Japanese Patent Application Laid-open No. 2006-11683, it is difficult to ascertain a processing state of the whole computer system, because numerous types of transactions, from highly frequent transactions to infrequent ones, are created.

Furthermore, in another method, transactions are grouped based on starting messages (opening message of each transaction). However, such conventional method cannot connect a group of transactions each of which has a different opening message but also a common part in the rest of transaction message.

SUMMARY OF THE INVENTION

It is an object of the present invention to at least partially solve the problems in the conventional technology.

According to an aspect of the present invention, a method of analyzing a processing state of a computer system that includes a plurality of types of unit processing, includes selecting a plurality of representative unit processing based on similarities between individual units of the unit processing; and grouping each unit processing based on similarity between the each unit processing and each of representative unit processing selected at the selecting.

According to another aspect of the present invention, a system analyzing apparatus that analyzes a processing state of a computer system that includes a plurality of types of unit processing includes a selecting unit that selects a plurality of representative unit processing based on similarities between individual units of the unit processing; and a grouping unit that groups each unit processing based on similarity between the each unit processing and each of representative unit processing selected by the selecting unit.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a detailed functional block diagram of a transaction analyzing apparatus according to a first embodiment of the present invention;

FIG. 2 is an example of transaction information present in a transaction information storage unit in the transaction analyzing apparatus shown in FIG. 1;

FIG. 4 is an example of transaction information that includes symbolic descriptions in addition to the transaction information shown in FIG. 2;

FIG. 5 is an example of a set of elements present in a transaction-element dissimilarity storage unit in the transaction analyzing apparatus shown in FIG. 1;

FIG. 6 is a schematic for explaining dissimilarity between elements in transactions according to the first embodiment;

FIG. 7 is an example of calculation results of dissimilarity between elements according to the first embodiment;

FIG. 8 is a schematic for explaining transaction dissimilarity according to the first embodiment;

FIG. 9 is an example of calculation results of transaction dissimilarity to be stored in a transaction-dissimilarity storage unit in the transaction analyzing apparatus shown in FIG. 1;

FIG. 10 is an example of selected representative transactions according to the first embodiment;

FIG. 19 is examples of a summary display screen and a detail display screen on a display device of the transaction analyzing apparatus shown in FIG. 1;

DETAILED DESCRIPTION OF THE PREFERRED EMBODIMENTS

Figure 3A:
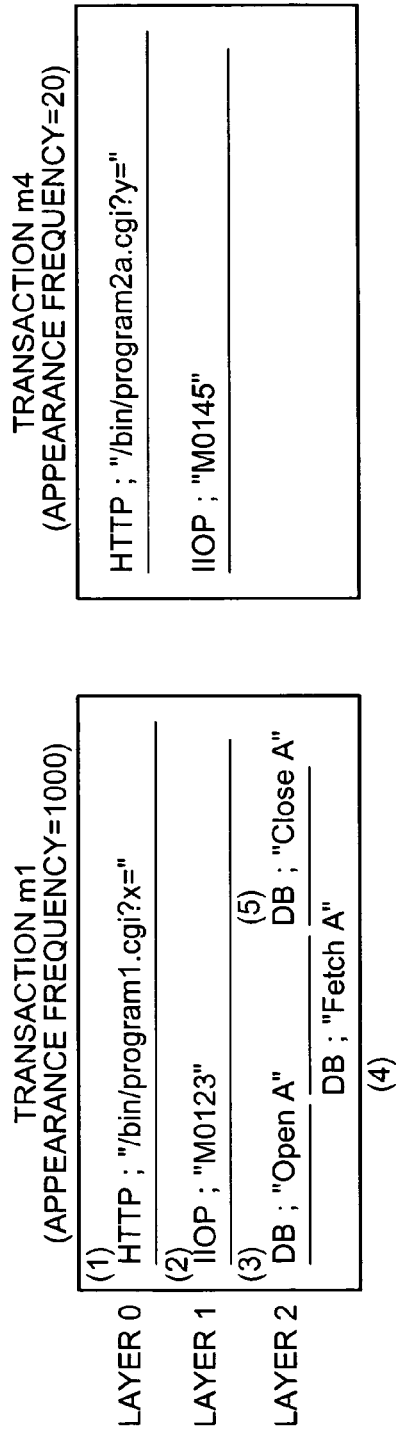
FIGS. 3A and 3B are schematics for explaining a structure and elements of a transaction, and a symbolic description of the elements, included in the transaction information shown in FIG. 2.

Exemplary embodiments of the present invention will be explained below in detail with reference to accompanying drawings.

FIG. 1 is a detailed functional block diagram of a transaction analyzing apparatus 1 according to a first embodiment of the present invention. As shown in FIG. 1, the transaction analyzing apparatus 1 includes an input unit 11, an output unit 21, a transaction-information storage unit (hereinafter, "TIS unit") 31, a transaction-element dissimilarity storage unit (hereinafter; "TEDS unit") 32, a transaction-dissimilarity storage unit (hereinafter, "TDS unit") 33, a transaction-group information storage unit (hereinafter, "TGIS unit") 34, a transaction-element dissimilarity calculating unit (hereinafter, "TEDC unit") 41, a transaction-dissimilarity calculating unit (hereinafter, "TDC unit") 42, a representative-transaction creating unit (hereinafter, "RTC unit") 43, a transaction-group creating unit (hereinafter, "TGC unit") 44, a display unit 45, and a control unit 50.

The input unit 11 receives instructions for transaction analysis from a user. Specifically, the input unit 11 receives an instruction created by the user via a mouse or a keyboard. The output unit 21 outputs an analysis result obtained by the transaction analyzing apparatus 1. Specifically, the output unit 21 displays an analysis result on a display device.

The TIS unit 31 stores therein transaction information that is information of transactions conducted in a computer system subjected to analysis.

The TEDS unit 32 stores therein transaction element dissimilarity that is information of dissimilarity between sets of elements or individual elements forming transactions.

The TDS unit 33 stores therein transaction dissimilarity that is information of dissimilarity between transactions.

The TGIS unit 34 stores therein information of a representative transaction that is selected from transactions based on transaction dissimilarities, and also stores therein transaction group information that is information of a transaction group obtained by grouping transactions based on the representative transaction.

The TEDC unit 41 calculates dissimilarity between individual elements that form transactions of which information is present in the TIS unit 31. The TEDC unit 41 stores calculated element dissimilarity into the TEDS unit 32.

The TDC unit 42 calculates dissimilarity of a transaction to another transaction among transactions of which information is present in the TIS unit 31. The TDC unit 42 stores calculated transaction dissimilarity into the TDS unit 33.

The RTC unit 43 selects a representative transaction from transactions of which information is present in the TIS unit 31 based on dissimilarities between the transactions. The RTC unit 43 stores information of selected representative transaction into the TGIS unit 34.

The TGC unit 44 groups transactions based on selected representative transactions. The TGC unit 44 stores information of a created transaction group into the TGIS unit 34.

The display unit 45 displays transaction group information via the output unit 21, which includes a summary display unit 45a and a detail display unit 45b.

The summary display unit 45a displays only information related to representative transactions. The detail display unit 45b displays information of a representative transaction and other transactions (hereinafter, "derivative transactions") in a transaction group among transaction groups.

The control unit 50 controls the input unit 11, the output unit 21, the TEDC unit 41, the TDC unit 42, the RTC unit 43, the TGC unit 44, and the display unit 45 to cause the transaction analyzing apparatus 1 to operate as an apparatus.

Next, summarizing (grouping) of transactions performed by the transaction analyzing apparatus 1 will be explained below with reference to FIGS. 2 to 13. FIG. 2 is an example of transaction information present in the TIS unit 31. As shown in FIG. 2, the TIS unit 31 stores therein a transaction type identification (ID) that denotes a type of a transaction, a transaction structure and elements that describe an object of the transaction, and an appearance frequency of the transaction, with respect to each transaction.

Figure 3B:
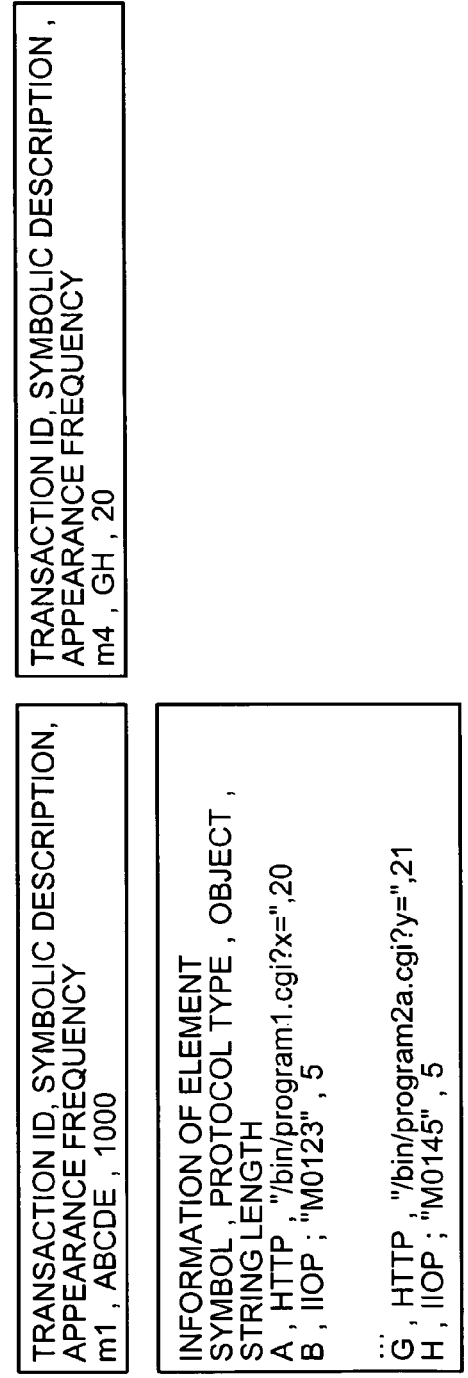

FIGS. 3A and 3B are schematics for explaining a structure and elements of a transaction, and a symbolic description of the elements. As shown in FIG. 3A, a transaction has three layers. A layer 0 is a web server layer, a layer 1 is an application server layer, and a layer 2 is a database server layer.

For example, in a transaction m1, an element (1) (HTTP; "/bin/program1.cgi?x=") in the layer 0 is executed at first. Next, an element (2) (IIOP;"M0123") in the layer 1 is executed, and then after elements in the layer 2 are executed, the processing goes back to the layer 1.

In the layer 2, an element (3) (DB;"Open A"), an element (4) (DB;"Fetch A"), and an element (5) (DB;"Close A") are executed. After these elements are all executed, the processing goes back to the element (2), and the element (1) in order, then is ended. After the whole processing is finished, a processing result obtained with the transaction m1 is returned, and then the transaction m1 is ended.

In FIG. 3B, each element shown in FIG. 3A is associated with a symbol so that the transactions are symbolically described. As shown in FIG. 3B, the element (1) (HTTP;"/bin/program1.cgi?x=") is associated with a symbol "A", and the element (2) (IIOP;"M0123") is associated with a symbol "B". Likewise, each of the rest of the elements is associated to a symbol, so that the transaction m1 can be symbolically described as "ABCDE".

Information of each element includes a symbol for identifying the element, a protocol type, an object, and a string length of the object. For example, in the element (1) (HTTP; "/bin/program1.cgi?x="), its symbol is "A", its protocol type is "HTTP", its object is "/bin/program1.cgi?x=", a string length of the object is "20".

FIG. 4 is an example of transaction information that additionally includes symbolic descriptions. As shown in FIG. 4, for example, the transaction ml additionally includes a symbolic description, "ABCDE", which symbolically describes elements.

The TEDC unit 41 extracts these elements from transaction information and groups them, assigns a symbol to each of grouped elements, and stores an element set that includes such elements with a symbol into the TEDS unit 32. FIG. 5 is an example of an element set present in the TEDS unit 32. As shown in FIG. 5, the element set stores therein elements so that each element is associated with a symbol for identifying the element, a protocol type, an object, and a string length of the object.

The TEDC unit 41 then calculates a dissimilarity between elements in transactions, ed(p, q), based on the element set. FIG. 6 is a schematic for explaining dissimilarities between elements in transactions.

As shown in FIG. 6, if two elements p and q use the same protocol, a dissimilarity ed(p, q) is defined as:

$$ed(p, q) = \text{(edit distance between } p \text{ and } q)/(\text{sum of string lengths of } p \text{ and } q)$$

If the elements p and q use different protocols each other, the dissimilarity is defined as:

$$ed(p, q) = 1 \text{ (constant value)}$$

For example, in FIG. 6, an element A and an element G use the same protocol, and an edit distance between an object of the element A and an object of the element G is three. Precisely, the object of the element A (/bin/program1.cgi?x=) is edited three times, i.e., a character is inserted, deleted, or replaced, three times in total, to obtain the object of the element G (/bin/program2a.cgi?y=). In addition, a string length of the object of the element A is "20", and a string length of the object of the element G is "21", so that a dissimilarity between the element A and the element G, ed(A, G) is:

$$ed(A, G) = 3/(20+21) \approx 0.0731$$

The element A and an element B use different protocols each other, so that a dissimilarity between the element A and the element B, ed(A, B), takes the constant value:

$$ed(A, B) = 1$$

The TEDC unit 41 calculates a transaction dissimilarity ed(p, q) between the elements in the element set shown in FIG. 5, and stores resultant values into the TEDS unit 32. FIG. 7 is an example of calculation results of dissimilarities between elements.

Moreover, the TEDC unit 41 adds a symbolic description of elements in each transaction to each transaction information in the TIS unit 31, as shown in FIG. 4.

Next, the TDC unit 42 calculates transaction dissimilarity that is dissimilarity of a transaction t to a transaction s, td(s, t), based on the transaction information that additionally includes the symbolic description shown in FIG. 4.

FIG. 8 is a schematic for explaining transaction dissimilarity. As shown in FIG. 8, the dissimilarity of the transaction t to the transaction s, td(s, t) is defined as:

$$td(s, t) = \text{wed}(s, t) \times (\text{appearance frequency of } t),$$

where wed(s, t) is a weighted edit distance between symbolic descriptions of s and t; when a symbol p is replaced with a symbol q, ed(p, q) is used for calculation; when a symbol p is added or deleted, a constant value 0.2 is used for calculation.

For example, in FIG. 8, when calculating a dissimilarity of a transaction m4 to the transaction m1, td(m1, m4), at first, a weighted edit distance between the two transactions, wed (m1, m4), is calculated.

Here, a symbolic description of the elements in the transaction m1 is "ABCDE", and a symbolic description of elements in the transaction m4 is "GH". From the symbolic description of the elements "GH" in the transaction m4, G is replaced with A, and H is replaced with B. Furthermore, C, D, and E are added to this, so that the symbolic description of the elements "ABCDE" in the transaction ml is obtained.

Here, ed(G, A)=ed(A, G), and in FIG. 6, ed(A, G)=0.0731. As a result, ed(G, A)=0.0731, and by calculating likewise, ed(H, B)=ed(B, H)=0.2 is obtained. Moreover, three elements, C, D, and E, are added, so that the constant value 0.2 is added three times. Consequently, the weighted edit distance between the symbolic description "ABCDE" and the symbolic description "GH", wed(ABCDE, GH), is calculated as:

$$\text{wed}(ABCDE, GH) = 0.0731 + 0.2 + 0.2 \times 3 = 0.8731.$$

After wed(m1, m4) is calculated, resultant value is multiplied by an appearance frequency of the transaction m4, so that the dissimilarity of the transaction m4 to the transaction m1, td(m1, m4), is calculated. Where the appearance frequency of the transaction m4 is "20", td(m1, m4) is calculated as:

$$td(m1, m4) = 0.8731 \times 20 = 17.462.$$

On the contrary, a dissimilarity of the transaction ml to the transaction m4 td(m4, m1) is calculated, where an appearance frequency of the transaction m1 is "1000", and wed(m4, m1)=wed(m1, m4), the dissimilarity is calculated as follows:

$$td(m4, m1) = 0.8731 \times 1000 = 873.1$$

In other words, the dissimilarity between the transactions, td(s, t), is weighted with the appearance frequency of the transaction t, thereby loosing symmetry in wed(s, t).

The TDC unit 42 calculates td(s, t), which is defined as dissimilarity of a transaction t to a transaction s, with respect to all combinations of each transaction shown in FIG. 4, and stores calculation results into the TDS unit 33.

FIG. 9 is an example of calculation results of transaction dissimilarity to be stored in the TDS unit 33. As shown in FIG. 9, each pair of two transactions mi and mj is associated with a weighted edit distance between symbolic descriptions of elements, wed (mi, mj), an appearance frequency of the transaction mj, and a dissimilarity of the transaction mj to the transaction mi, td(mi, mj), to be stored in the TDS unit 33.

Thus, the TDC unit 42 calculates dissimilarities between transactions, and then using these values, the RTC unit 43 selects a representative transaction mi. Precisely, the RTC unit 43 selects representative transactions so as to minimize the total sum of dissimilarities between each transaction and a most similar representative transaction in the transaction set. Here, because td is weighted with an appearance frequency of a transaction, a transaction that appears frequently and is not similar to other highly frequent transactions is given priority to be selected as a representative transaction.

Specifically, the RTC unit 43 repeats the following procedure until the number of elements of R* reaches a certain number, where a set of transactions is M, a set of already selected representative transactions is R* (initial value={ }), and a scale of dissimilarity between transactions is D.

(i) Take out a transaction mi from M\R* (set of elements of M not belonging to R*) sequentially, where D=0

(ii) Where mj is each transaction in the rest of the transactions, i.e., mj∈M\{mi∪R*}, and mk is each transaction in {mi∪R*}, (1) Calculate dissimilarities between mj and mk, td(mk, mj), and choose mk so as to minimize resultant dissimilarities.

(2) Add td(mk, mj) to D.

(iii) Select mi so as to minimize D, and add mi to elements of R*.

FIG. 10 is an example of selected representative transactions. FIG. 10 presents four representative transactions m1, m2, m3, and m8 selected based on the transaction dissimilarities shown in FIG. 9.

To create a transaction group, the TGC unit 44 chooses a representative transaction, and groups transactions from the rest of the transactions as derivative transactions belonging to the representative transaction such that the representative transaction has a minimum dissimilarity to each of the derivative transactions, i.e., the representative transaction is the most similar to each of the derivative transactions, based on the transaction dissimilarities.

Precisely, the TGC unit 44 chooses a representative transaction mk from R* so as to minimize td(mk, mj) with respect to each transaction mj in the rest of the transactions, i.e., mj∈M\R*. The TGC unit 44 then assigns mj as a derivative transaction to the representative transaction mk. Consequently, each representative transaction and transactions grouped and assigned to the representative transaction (derivative transactions) form a transaction group.

Figure 11:
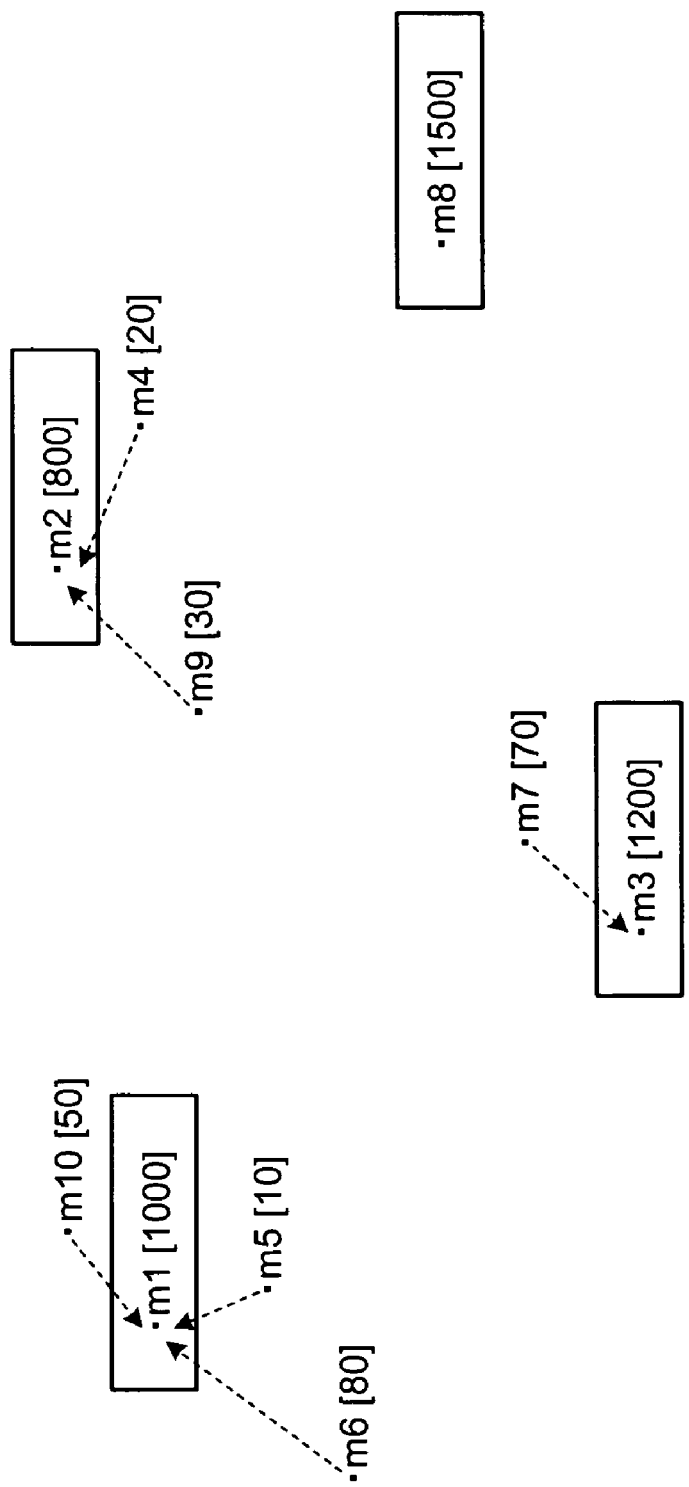
FIG. 11 is an example of grouping derivative transactions according to the first embodiment.

FIG. 11 is an example of grouping derivative transactions. As shown in FIG. 11, with respect to four representative transactions m1, m2, m3, and m8, the rest of transactions are grouped based on dissimilarities.

Figure 12:
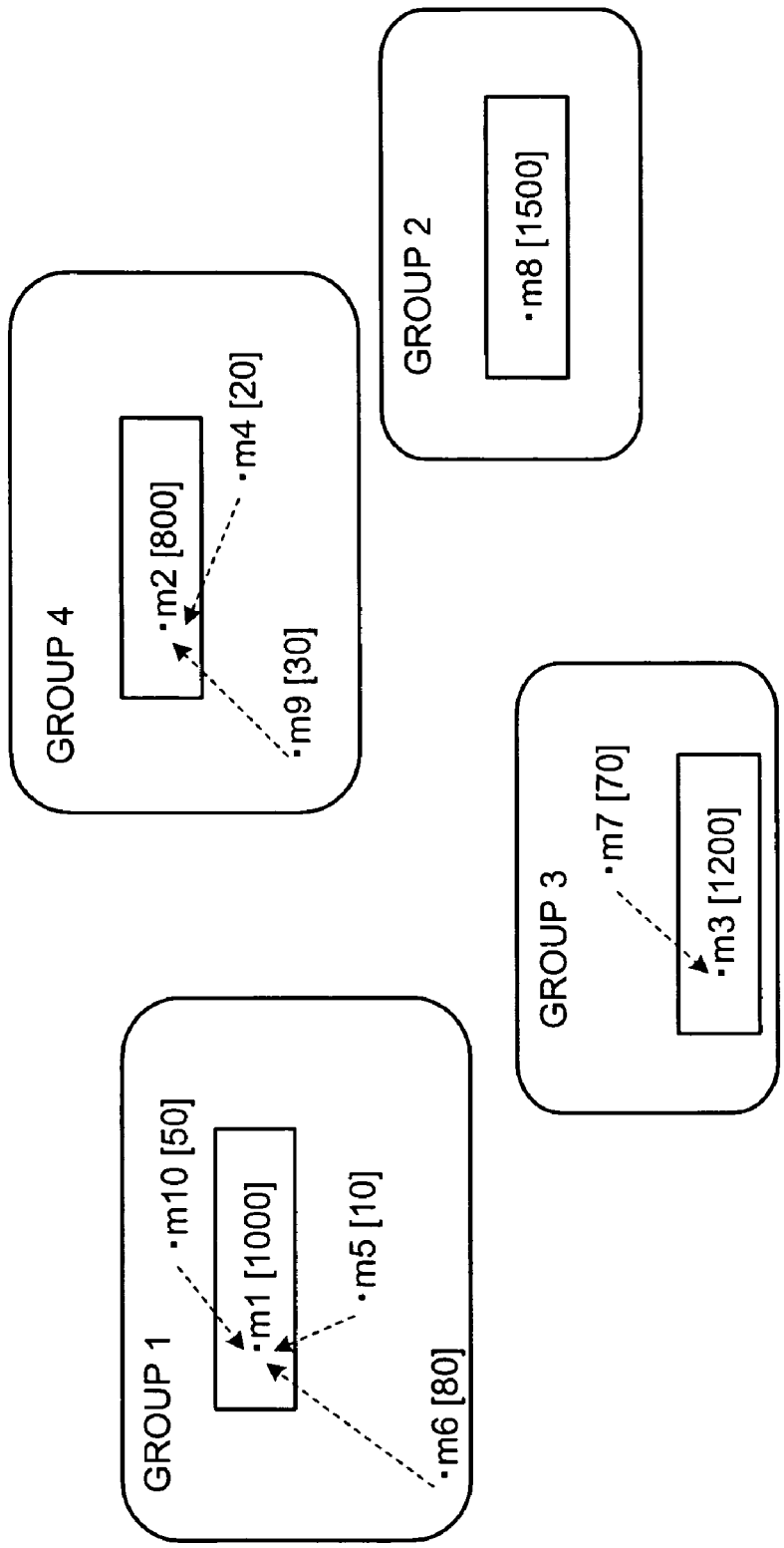
FIG. 12 is an example of creating transaction groups according to the first embodiment.

FIG. 12 is an example of creating transaction groups. As shown in FIG. 12, respective representative transactions, m1, m2, m3, and m8 form four transaction groups with respective derivative transactions.

Figure 13:
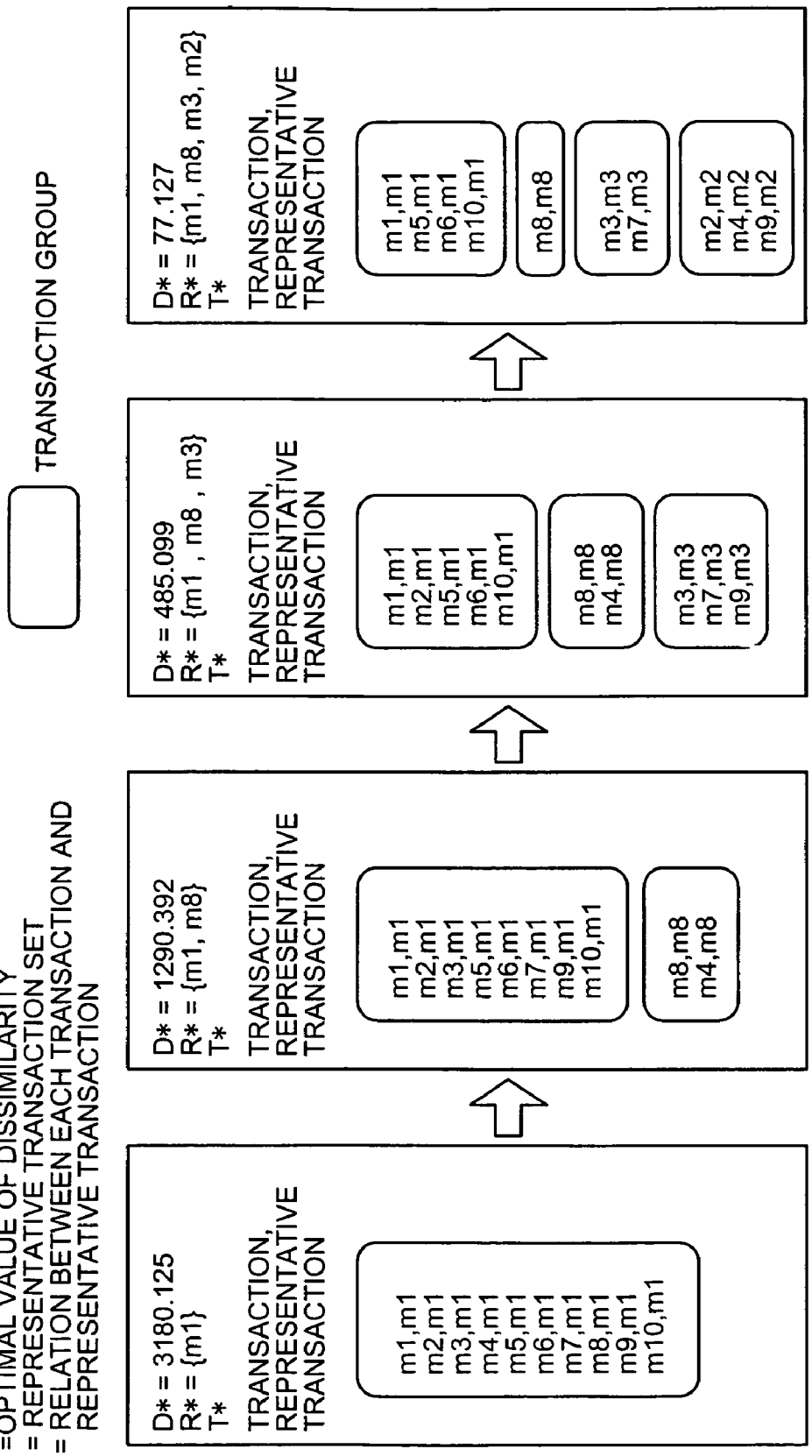
FIG. 13 is a schematic for explaining a procedure of forming the transaction groups shown in FIG. 12.

FIG. 13 is a schematic for explaining a procedure of forming the transaction groups shown in FIG. 12. As shown in FIG. 13, every time when the RTC unit 43 selects a new representative transaction, the total sum of transaction dissimilarities D* is declined, thereby summarizing all transactions with these representative transactions.

Figure 14:
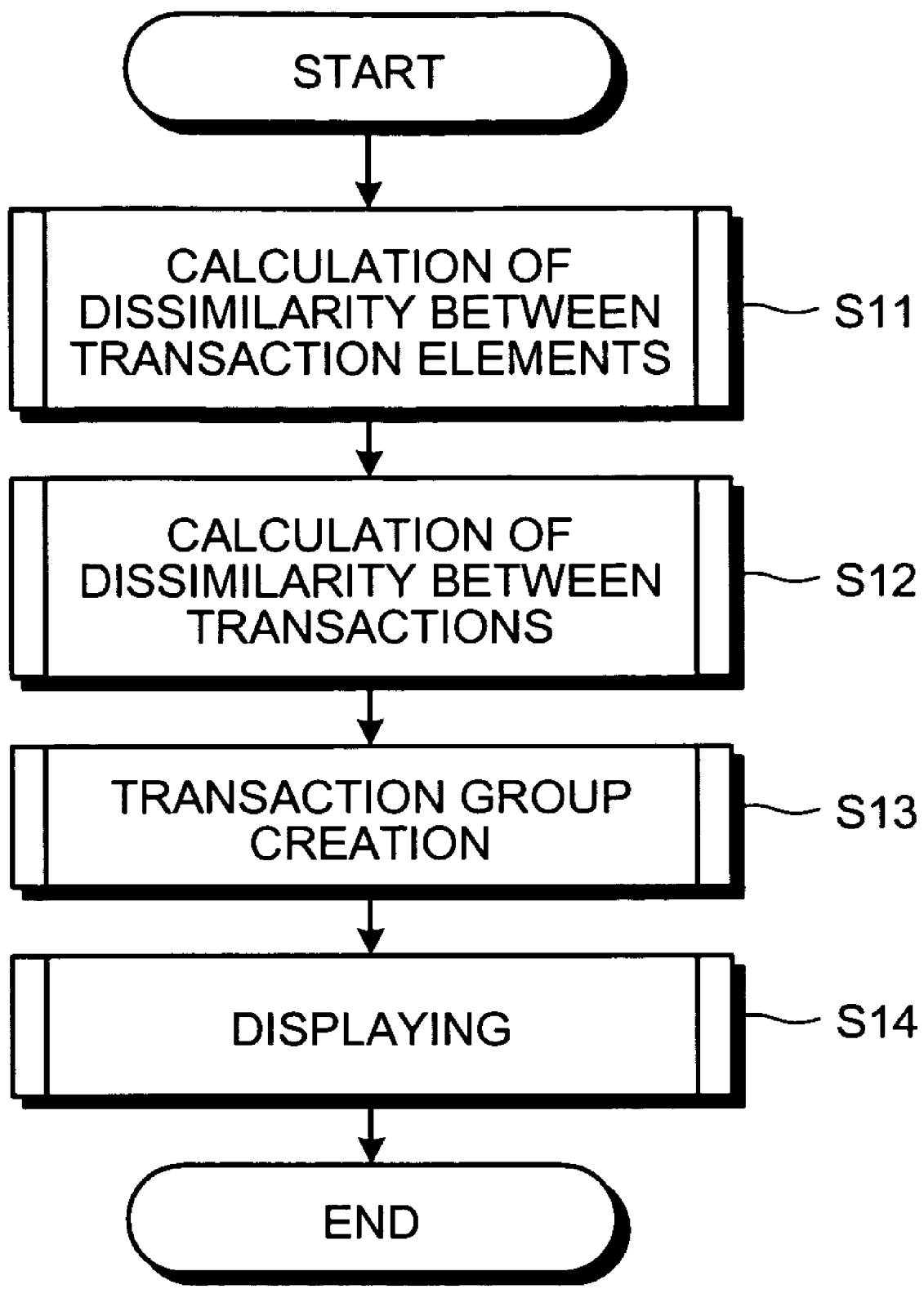
FIG. 14 is a flowchart of a processing procedure of transaction summarizing performed by the transaction analyzing apparatus shown in FIG. 1.

Next, FIG. 14 is a flowchart of a processing procedure of transaction summarizing performed by the transaction analyzing apparatus 1.

As shown in FIG. 14, the TEDC unit 41 performs calculation of dissimilarity between transaction elements, at which the TEDC unit 41 calculates dissimilarity between elements, ed(p, q), based on the transaction information present in the TIS unit 31, and stores calculation results into the TEDS unit 32 (step S11).

The TDC unit 42 then performs calculation of dissimilarity between transactions, at which the TDC unit 42 calculates a dissimilarity of transaction t to transaction s, td(s, t), based on information present in the TIS unit 31 and the TEDS unit 32, and stores a calculation result into the TDS unit 33 (step S12).

The RTC unit 43 and the TGC unit 44 then perform transaction group creation, at which the RTC unit 43 selects representative transactions and the TGC unit 44 creates transaction groups based on information present in the TIS unit 31 and the TDS unit 33, and a creation result is stored into the TGIS unit 34 (step S13).

The summary display unit 45a then displays a summary and the detail display unit 45b displays details using transaction group information present in the TGIS unit 34 in accordance with an instruction received via the input unit 11 from a user (step S14).

Thus, transactions can be grouped as the TEDC unit 41 calculates dissimilarities between elements, the TDC unit 42 calculates dissimilarities between transactions, the RTC unit 43 selects representative transactions, and the TGC unit 44 creates transaction groups.

Figure 15:
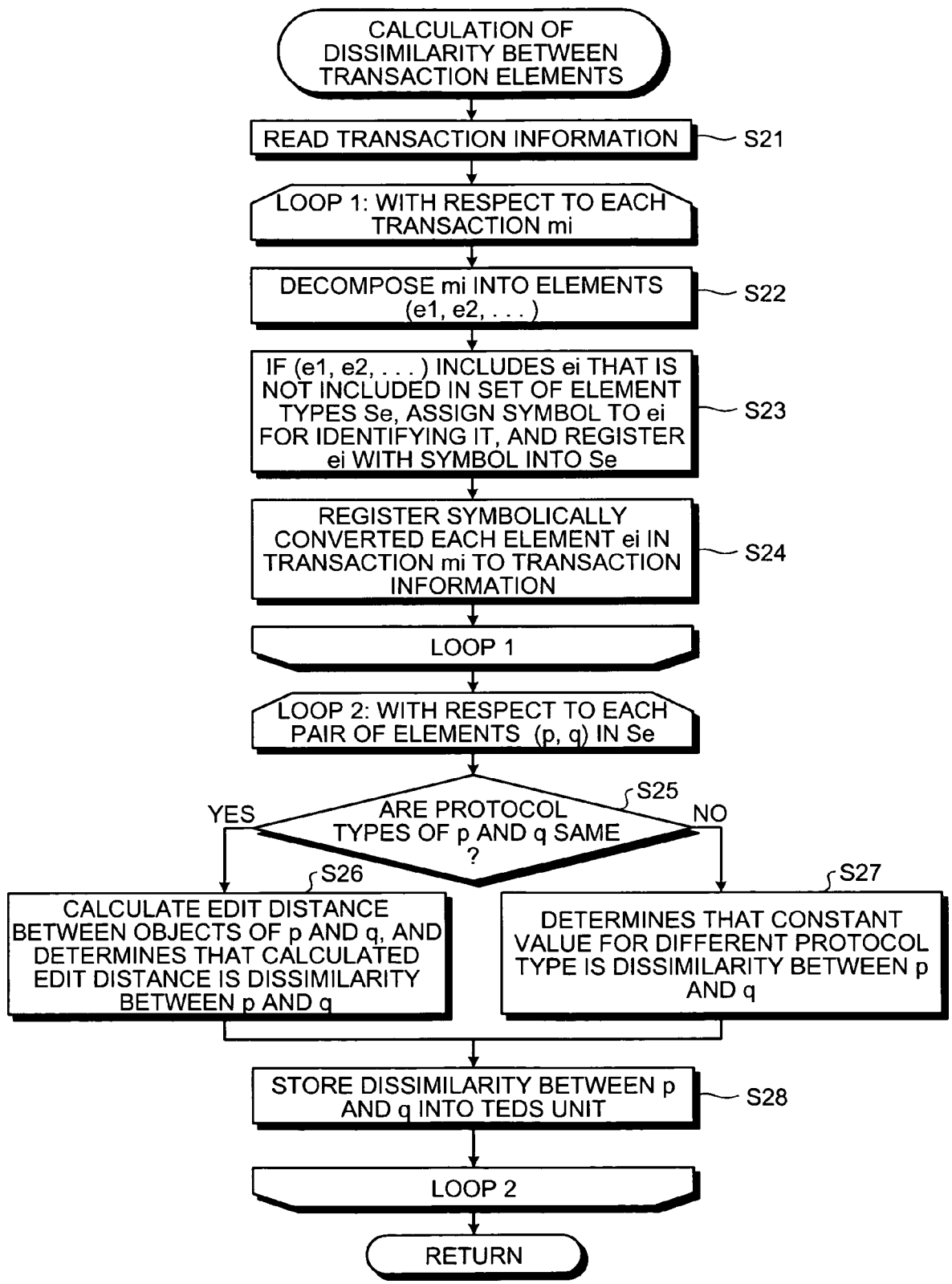
FIG. 15 is a flowchart of a processing procedure of calculation of dissimilarity between transaction elements shown in FIG. 14.

Next, FIG. 15 is a flowchart of a processing procedure of the calculation of dissimilarity between transaction elements shown in FIG. 14. As shown in FIG. 15, the TEDC unit 41 reads transaction information present in the TIS unit 31 (step S21)

The TEDC unit 41 then performs processing described in the following steps S22 to S24 on each transaction mi. Precisely, the TEDC unit 41 decomposes a transaction mi into elements (e1, e2, . . . ) (step S22); if an element ei in the elements (e1, e2, . . . ) is not included in an element set Se, assigns a symbol to the element ei for identifying IC it and registers the element ei with the symbol into the element set Se, and also stores the element ei with the symbol into the TEDS unit 32 (step S23); and adds a symbolic description of the transaction mi in which each element ei is symbolically converted, into the TIS unit 31 (step S24).

The TEDC unit 41 then performs processing described in the following steps S25 to S28 on each pair of elements, (p, q), in the element set Se. Precisely, the TEDC unit 41 determines whether protocol types of an element p and an element q are the same (step S25), at first. As a result, if the protocol types are the same, the TEDC unit 41 calculates a dissimilarity between the elements p and q, ed(p, q), based on an edit distance between an object of p and an object of q, and string lengths of these objects (step S26). In contrast, if the protocol types are different, the TEDC unit 41 applies the constant value "1" to the dissimilarity between the elements p and q, ed(p, q) (step S27).

The TEDC unit 41 then stores the dissimilarity between the elements p and q, ed(p, q), into the TEDS unit 32 (step S28). After these processing are performed on all elements in the element set Se, the TEDC unit 41 ends the calculation of dissimilarity between transaction elements.

Thus, a dissimilarity between transactions can be calculated by using dissimilarities between elements as the TEDC unit 41 calculates dissimilarity between elements p and q, ed(p, q), with respect to all combinations of all elements in the element set Se.

Figure 16:
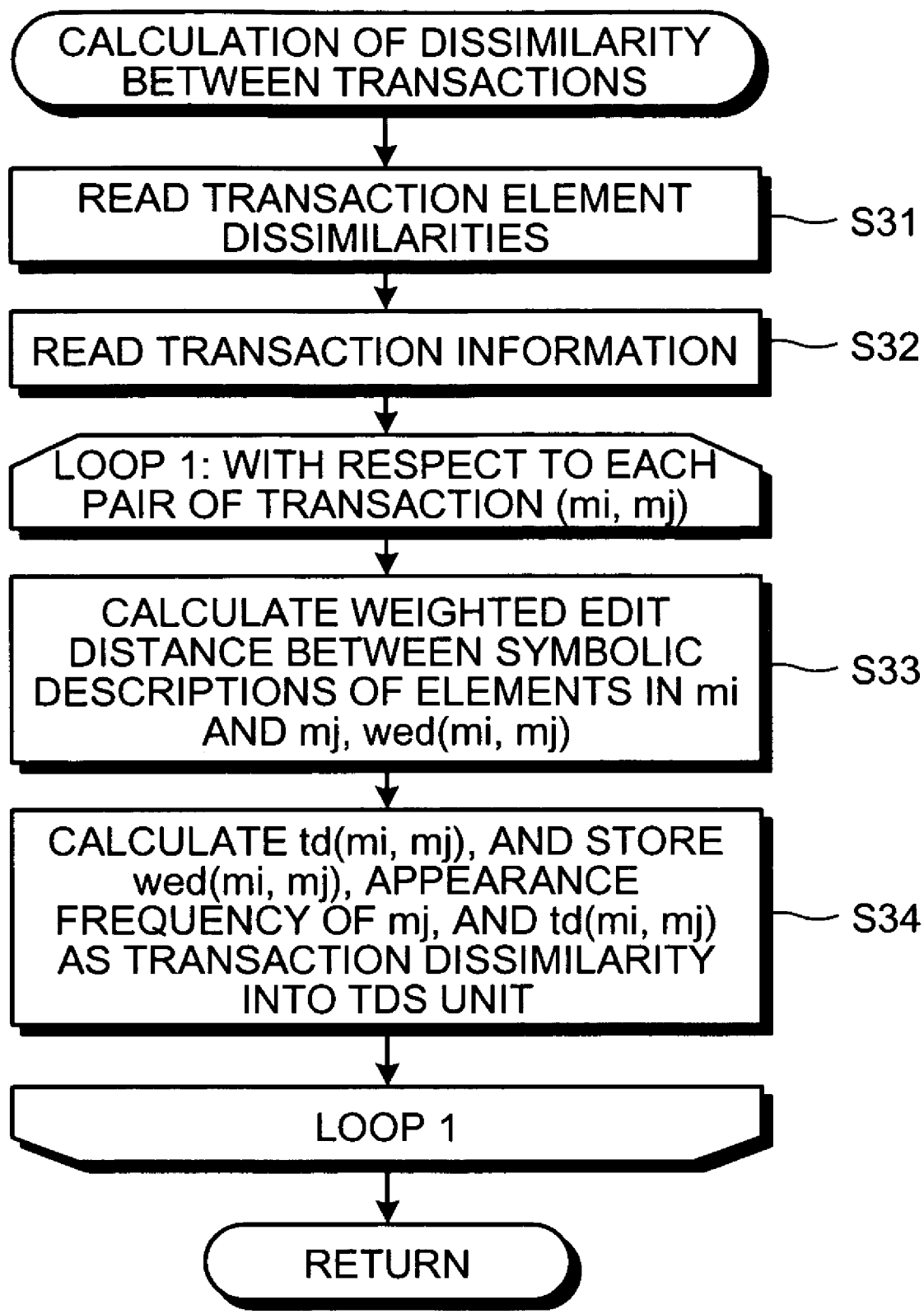
FIG. 16 is a flowchart of a processing procedure of calculation of dissimilarity between transactions shown in FIG. 14.

Next, FIG. 16 is a flowchart of a processing procedure of the calculation of dissimilarity between transactions shown in FIG. 14. As shown in FIG. 16, the TDC unit 42 reads transaction element dissimilarities present in the TEDS unit 32 (step S31), and reads transaction information present in the TIS unit 31 (step S32).

The TDC unit 42 then performs processing described in the following steps S33 to 534 on each pair of transactions, (mi, mj). Precisely, the TDC unit 42 calculates a weighted edit distance between symbolic descriptions of elements, wed (mi, mj), with respect to each pair of two transactions mi and mj (step S33).

The TDC unit 42 then calculates a dissimilarity of the transaction mj to the transaction mi, td(mi, mj) by multiplying wed (mi, mj) with an appearance frequency of the transaction mj, and stores wed (mi, mj), the appearance frequency of mj, and td(mi, mj) into the TDS unit 33 (step S34). After the TDC unit 42 performs these processing on all pairs of transactions (mi, mj), ends the calculation of dissimilarity between transactions.

Thus, transactions can be grouped by using dissimilarities between transactions as the TDC unit 42 calculates dissimilarities between transactions across all transaction pairs (mi, mj).

Figure 17:
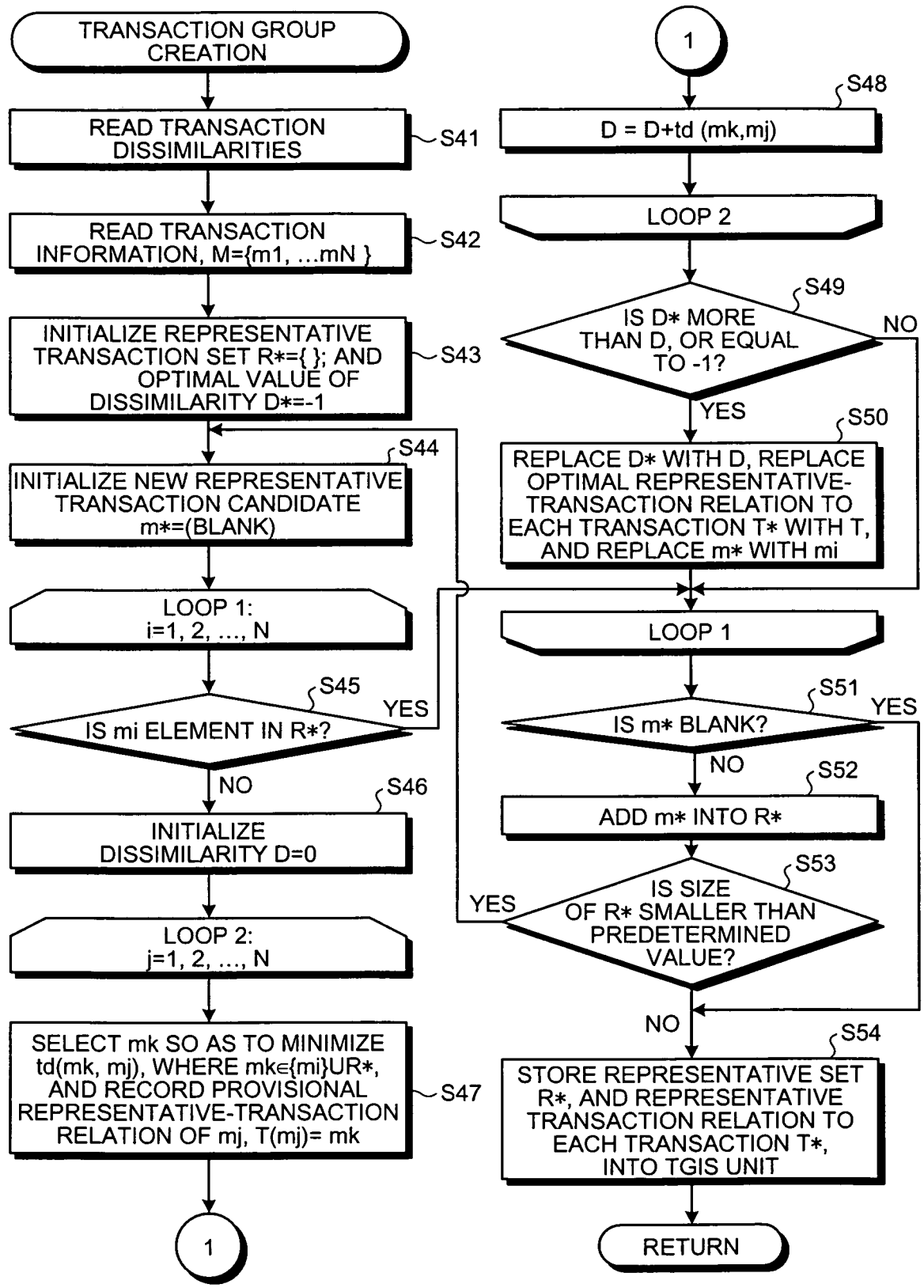
FIG. 17 is a flowchart of processing procedure of transaction group creation shown in FIG. 14.

Next, FIG. 17 is a flowchart of processing procedure of the transaction group creation shown in FIG. 14. As shown in FIG. 17, in the transaction group creation, the RTC unit 43 reads transaction dissimilarities from the TDS unit 33 (step S41), and reads transaction information from the TIS unit 31 (step S42).

The RTC unit 43 initializes the representative transaction set R* to a null set, initializes an optimal value of dissimilarity D* to "−1", (step S43), and initializes a new representative transaction candidate m* to a blank (step S44). By repeating the following procedure of steps S45 to S50 on each transaction mi, the RTC unit 43 creates a new representative transaction candidate m*, and the TGC unit 44 creates an optimal representative transaction relation T* to the each transaction mi, i.e., a transaction group.

To begin with, the RTC unit 43 determines whether a transaction mi is an element in R* (step S45). If the mi is an element in R*, the processing goes to another mi in the next. If the mi is not an element in R*, the RTC unit 43 initializes a dissimilarity D to "0" (step S46). The following procedure of steps S47 to S48 are repeated on each transaction mj: the TGC unit 44 records a provisional representative transaction relation, T(mj)=mk (mk∈{mi}∪R*), (step S47); and then the RTC unit 43 calculates the dissimilarity D as mi is a representative transaction (step S48).

When the RTC unit 43 finishes calculations on all transactions mj, the RTC unit 43 determines whether the dissimilarity D is improved (step S49). If it is improved, the RTC unit 43 replaces the optimal dissimilarity D* with improved dissimilarity D, and replaces m* with mi, and the TGC unit 44 replaces the optimal representative transaction relation T* with T corresponding to the improved dissimilarity D (step S50).

The RTC unit 43 then determines whether m* is a blank, i.e., any representative transaction that improves the dissimilarity is not found (step S51). If any representative transaction that improves the dissimilarity is found, the RTC unit 43 adds m* to the representative transaction set R* (step S52), and determines whether the size of R* is smaller than a predetermined value (step S53). Here, the predetermined value is the number of representative transactions desired to be selected.

As a result, if the size of R* is smaller than the predetermined value, the RTC unit 43 goes back to step S44 select a new representative transaction. In contrast, if the size of R* is not smaller than the predetermined value, or if any representative transaction that improves the dissimilarity is not found at step S51, the RTC unit 43 stores the representative transaction set R* into the TGIS unit 34, and the TGC unit 44 stores the relation between transactions and the representative transaction T* into the TGIS unit 34, and the transaction group creation is ended (step, S54).

Thus, an optimal representative transaction can be selected by selecting a new representative transaction depending on whether the dissimilarity D is improved if applying the new representative transaction to all transactions.

Figure 18:
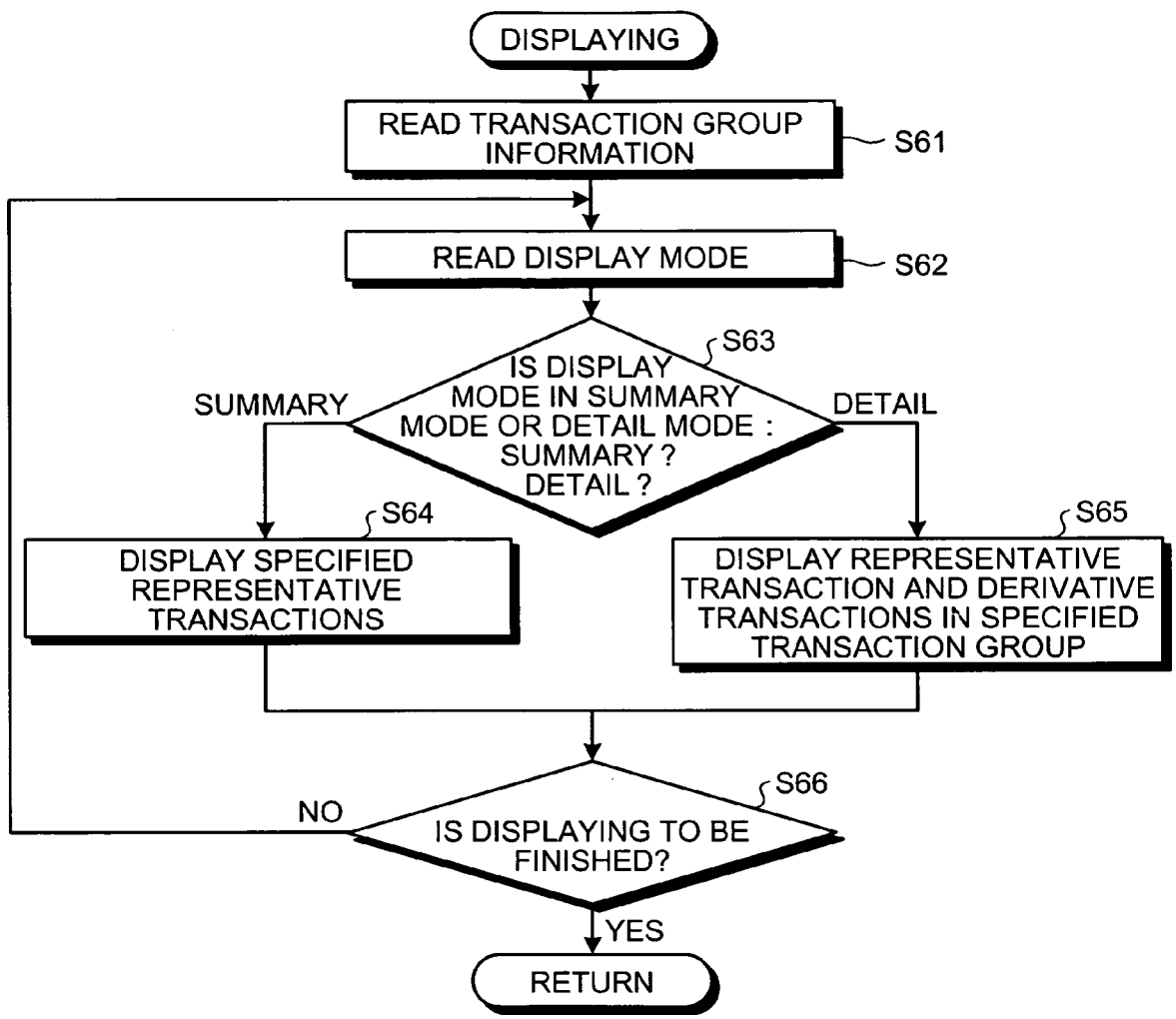
FIG. 18 is a flowchart of a processing procedure of displaying shown in FIG. 14.

Next, FIG. 18 is a flowchart of a processing procedure of displaying shown in FIG. 14. As shown in FIG. 18, in the displaying processing, the display unit 45 reads transaction information from the TGIS unit 34 (step S61), and the input unit 11 reads a display mode regulated in accordance with a user's instruction for setting a display (step S62).

The display unit 45 then determines whether the display mode is in a summary mode or a detail mode (step S63). If it is in the summary mode, the summary display unit 45*a* displays information related to representative transactions specified by the user (step S64). If it is in the detail mode, the detail display unit 45*b* displays information of a representative transaction and derivative transactions in a transaction group specified by the user (step S65).

The display unit 45 then determines whether displaying is to be finished (step S66). If displaying is not to be finished, the display unit 45 goes back to step S62 and displays information in accordance with the next instruction. In contrast, if displaying is to be finished, the display unit 45 ends displaying.

Thus, a user can select and display information suitable to system analysis, because the display unit 45 displays a summary or details based on a display mode. FIG. 19 is examples of a summary display screen and a detail display screen on a display device. As shown in FIG. 19, information of the transactions m1, m2, m3, and m8 is displayed in the summary mode, while in the detail mode, information of a transaction group of which the representative transaction is m1 is displayed.

Thus, according to the first embodiment, transactions can be precisely grouped, thereby ascertaining a processing state of a computer system.

In the first embodiment, the transaction analyzing apparatus 1 selects representative transactions and precisely groups transactions based on transaction dissimilarities. A grouping result of transactions and representative transactions can also be used for monitoring a processing state of the computer system. Therefore, in a second embodiment, a transaction monitoring apparatus 2 that monitors a processing state of a computer system by using a grouping result of transactions and representative transactions will be explained below.

Figure 20:
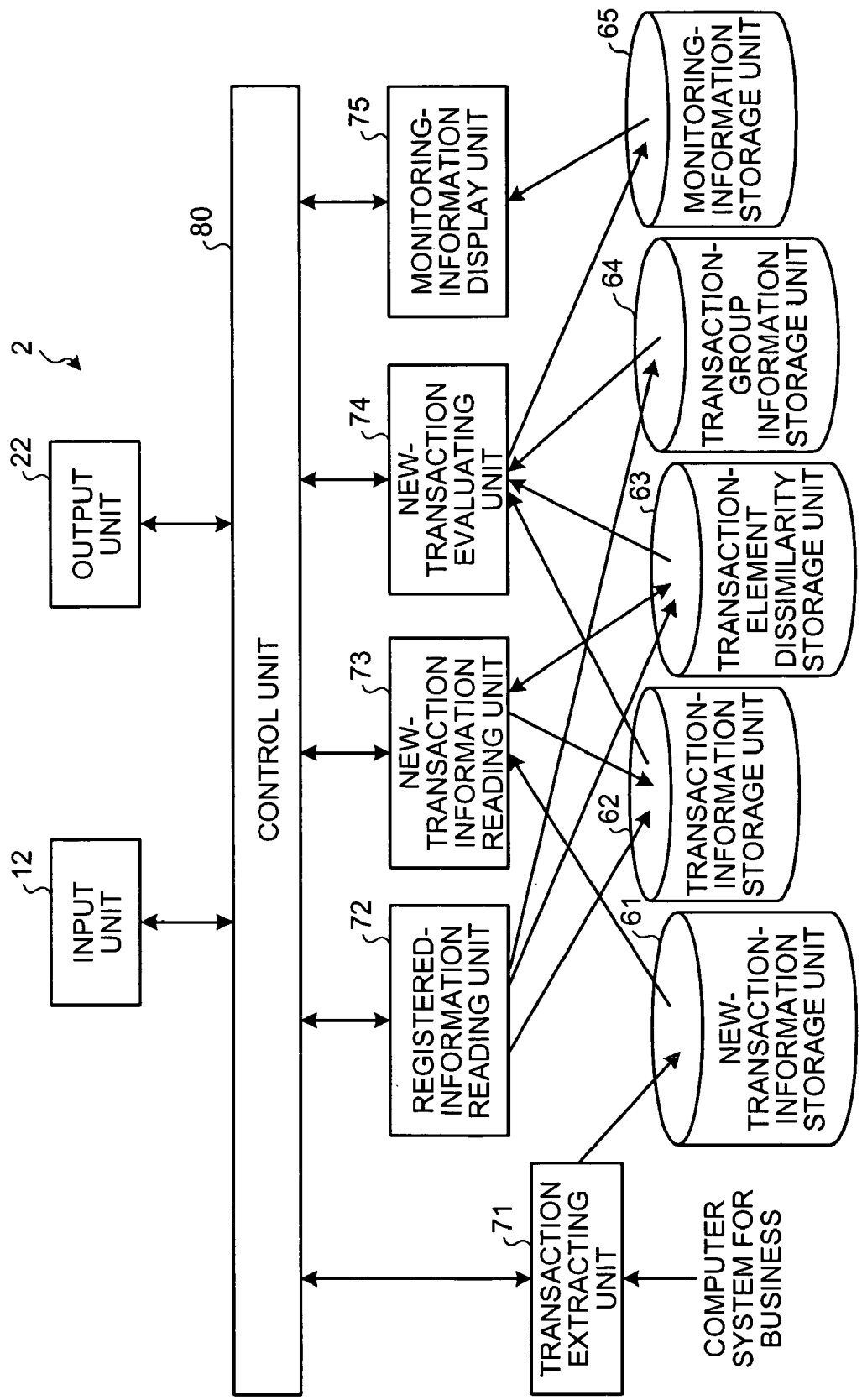
FIG. 20 is a detailed functional block diagram of a transaction analyzing apparatus according to a second embodiment of the present invention.

FIG. 20 is a detailed functional block diagram of the transaction monitoring apparatus 2 according to the second embodiment of the present invention. As shown in FIG. 20, the transaction monitoring apparatus 2 includes, an input unit 12, an output unit 22, a new-transaction-information storage unit (hereinafter, "NTIS unit") 61, a transaction-information storage unit (hereinafter, "TIS unit") 62, a transaction-element dissimilarity storage unit (hereinafter, "TEDS unit") 63, a transaction-group information storage unit (hereinafter, "TGIS unit") 64, a monitoring-information storage unit (hereinafter, "MIS unit") 65, a transaction extracting unit (hereinafter, "TE unit") 71, a registered-information reading unit (hereinafter, "RIS unit") 72, a new-transaction information reading unit (hereinafter, "NTIR unit") 73, a new-transaction evaluating unit (hereinafter, "NTE unit") 74, a monitoring-information display unit (hereinafter, "MID unit") 75, and a control unit 80.

The input unit 12 receives various instructions from a user for monitoring transactions. Specifically, the input unit 12 receives an instruction created by the user via a mouse or a keyboard. The output unit 22 outputs a monitoring result obtained by the transaction monitoring apparatus 2. Specifically, the output unit 22 displays a monitoring result on a display device.

The NTIS unit 61 stores therein information of a new transaction subjected to monitoring as new transaction information. The TIS unit 62 stores therein transaction information that is used for grouping transactions.

The TEDS unit 63 stores therein transaction element dissimilarities that are used for grouping transactions. The TGIS unit 64 stores-therein information related to representative transactions and transaction groups. The MIS unit 65 stores therein a monitoring result about a new transaction.

The TE unit 71 extracts a transaction from packets transmitted between the computer system and a client computer, and stores information of extracted transaction into the NTIS unit 61. In this example, the TE unit 71 is provided within the transaction monitoring apparatus 2, however, the TE unit 71 can also be provided in another device.

The RIS unit 72 inputs information used by the transaction analyzing apparatus 1 for transaction analysis, and an analysis result. Specifically, the RIS unit 72 stores information from the TIS unit 31 into the TIS unit 62, sores information from the TEDS unit 32 into the TEDS unit 63, and stores information from the TGIS unit 34 into the TGIS unit 64.

The NTIR unit 73 reads new transaction information present in the NTIS unit 61, decomposes the new transaction information into elements, passes resultant elements to the NTE unit 74, and stores the new transaction information into the TIS unit 62. Furthermore, the NTIR unit 73 revises information present in the TEDS unit 63, if the new transaction information includes a new element.

The NTE unit 74 monitors a new transaction, and stores a monitoring result into the MIS unit 65 as monitoring information.

The MID unit 75 displays monitoring information present in the MIS unit 65 via the output unit 22.

The control unit 80 controls the input unit 12, the output unit 22, the TE unit 71, the RIS unit 72, the NTIR unit 73, the NTE unit 74, and the MID unit 75 to cause the transaction monitoring apparatus 2 to operate as an apparatus.

Figure 21:
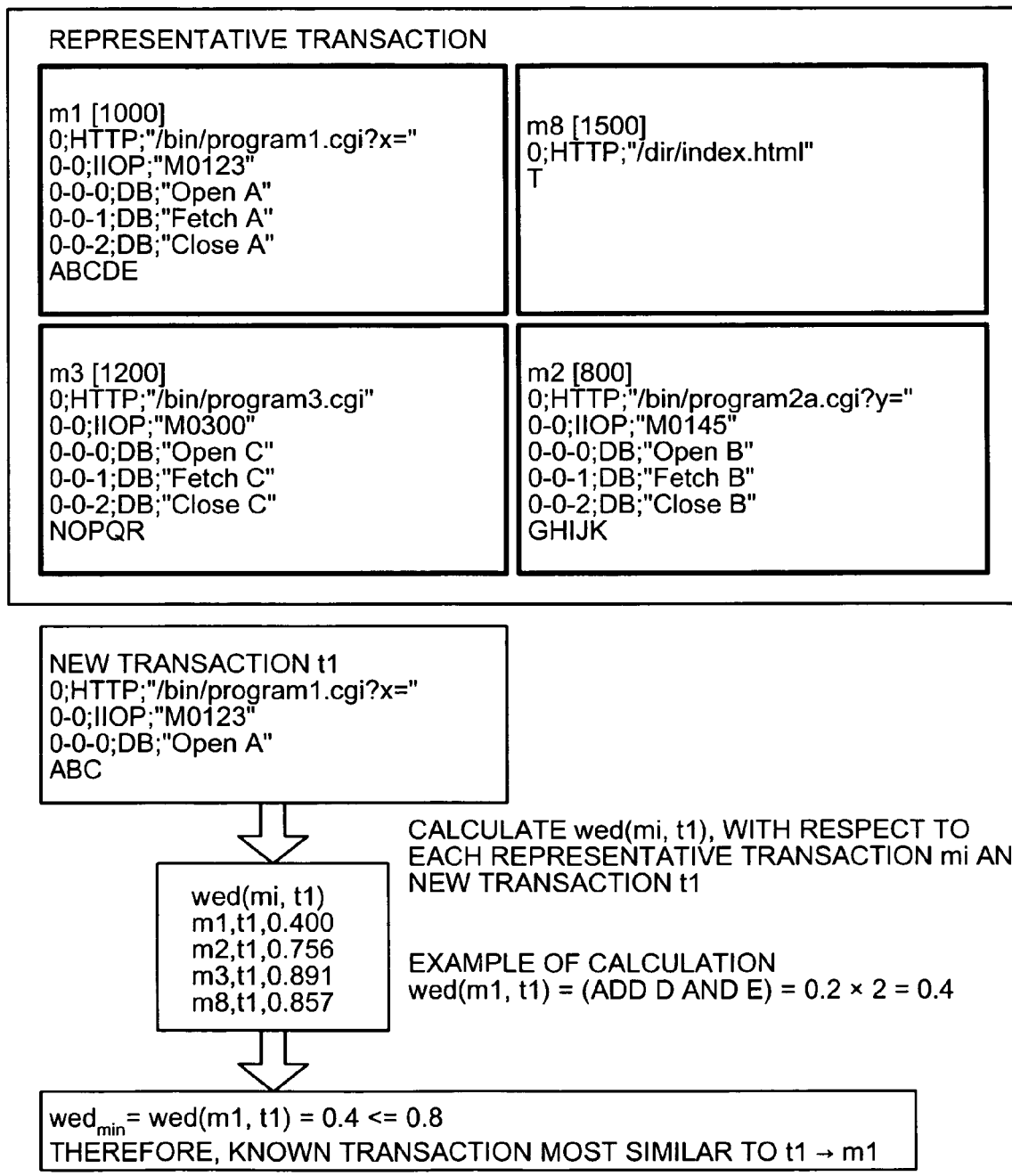
FIGS. 21 to 23 are schematics for explaining monitoring processing performed by a new-transaction evaluating unit in the transaction analyzing apparatus shown in FIG. 20.
Figure 22:
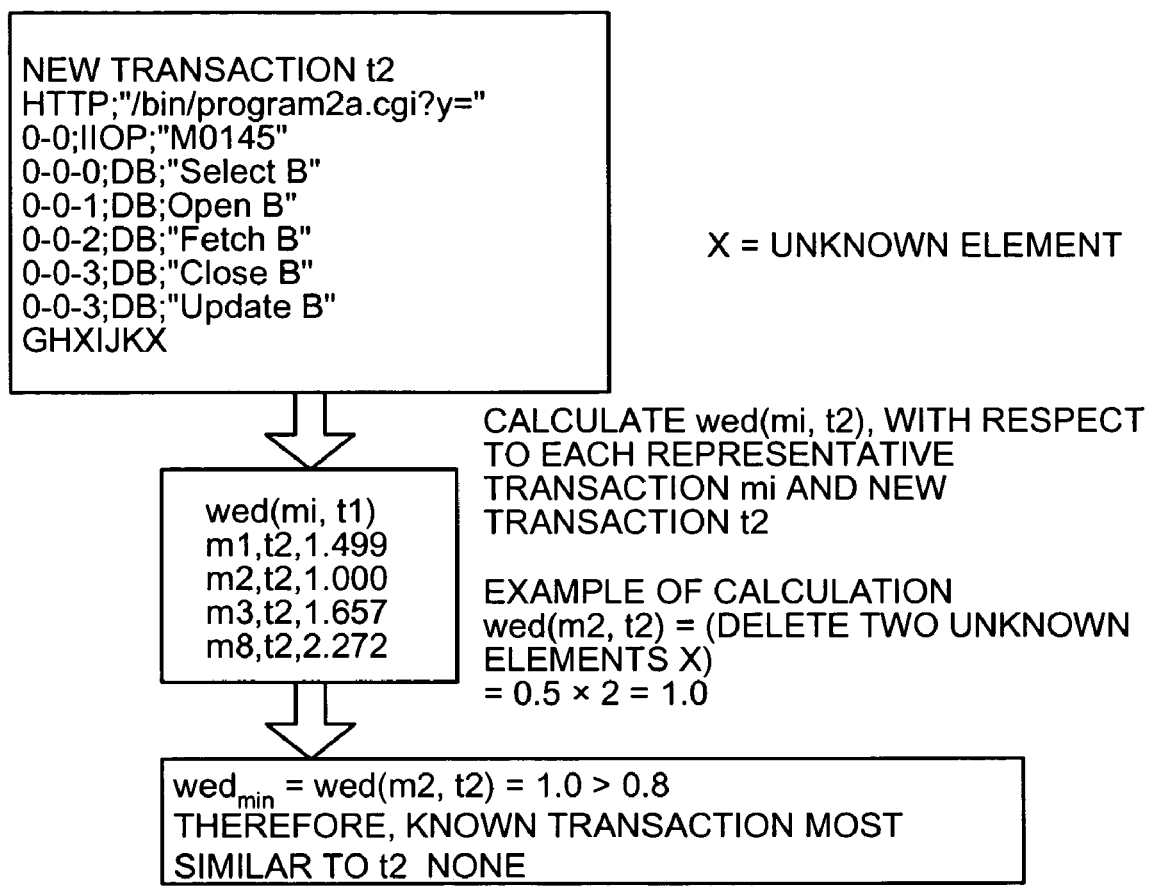
Figure 23:
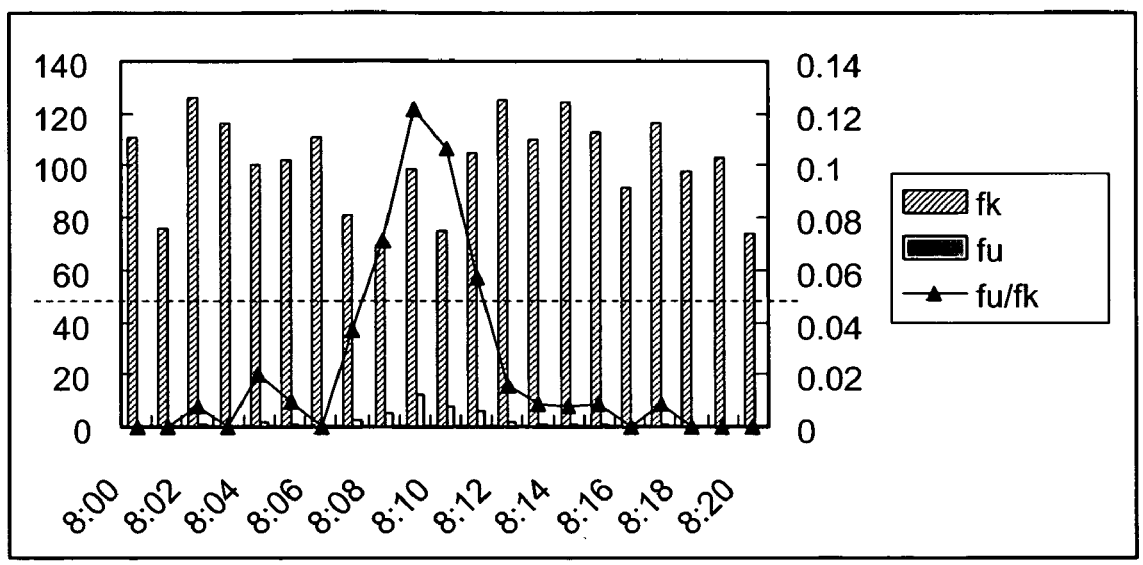

Next, FIGS. 21 to 23 are schematics for explaining monitoring processing performed by the NTE unit 74.

As shown in FIG. 21, the NTE unit 74 calculates a weighted edit distance between a new transaction t1 and each representative transaction mi, wed(mi, t1). In this example, an weight of adding or deleting a known symbol is "0.2", while an weight of adding or deleting an unknown symbol is "0.5".

The NTE unit 74 then calculates wed$_{min}$, a minimum value of weighted edit distance wed(mi, t1). If wed$_{min}$ is smaller than a threshold, the NTE unit 74 outputs a representative transaction having a minimum weighted edit distance as a most similar known transaction to the new transaction t1.

In the example in FIG. 21, the threshold is 0.8, and a weighted edit distance between t1 and a representative transaction m1 is minimum, and 0.4<0.8. Therefore, the NTE unit 74 outputs "m1" as the most similar known transaction to t1.

In contrast, in an example shown in FIG. 22, a weighted edit distance between a new transaction t2 and a representative transaction m2 is minimum, and 1.0>0.8. Therefore, the NTE unit 74 outputs "none" as none of known transactions is most similar to the new transaction t2.

Furthermore, as shown in FIG. 23, the NTE unit 74 calculates a ratio of an occurrence frequency of "no similar transaction is known" per unit time, fu, to an occurrence frequency of "similar transaction is known" per unit time, fk. If fu/fk exceeds a threshold, the NTE unit 74 issues an alert. In FIG. 23, the threshold is 0.05, and if fu/fk exceeds a broken line indicating 0.05, the NTE unit 74 issues an alert.

In this example, the NTE unit 74 calculates a weighted edit distance between a new transaction and each representative transaction, but also the NTE unit 74 can calculates a minimum value by performing a weighted edit distance calculation including derivative transactions. Moreover, the NTE unit 74 can obtain a minimum value by performing a weighted edit distance calculation focusing on particular transactions that have a similar opening message.

Figure 24:
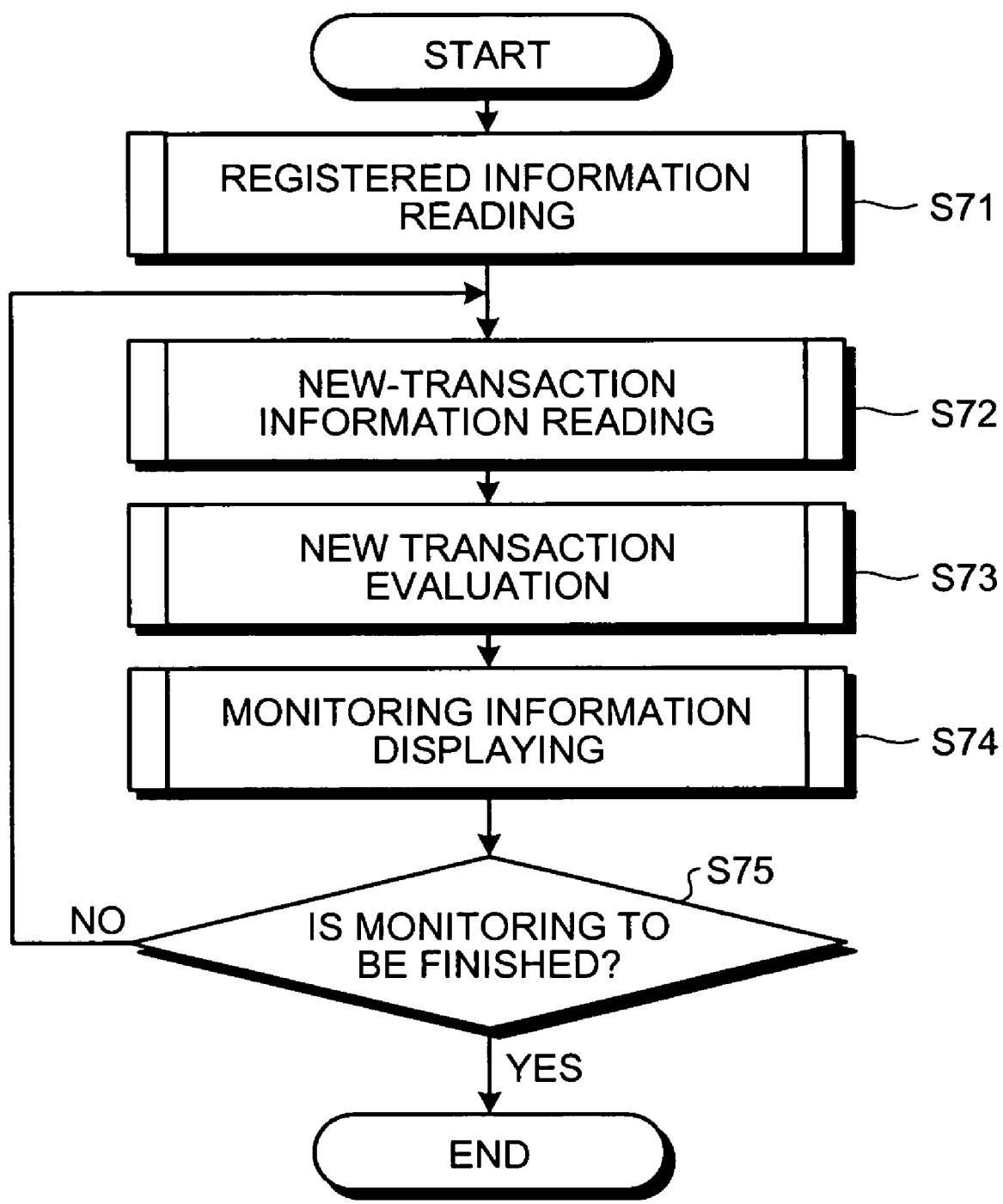
FIG. 24 is a flowchart of a processing procedure performed by the transaction analyzing apparatus shown in FIG. 20.

Next, FIG. 24 is a flowchart of a processing procedure performed by the transaction monitoring apparatus 2. In this example, it is assumed that new transaction information is present in the NTIS unit 61 as stored by the TE unit 71.

As shown in FIG. 24, in the transaction monitoring apparatus 2, the RIS unit 72 performs registered-information reading to read registered information (step S71). Here, the registered information includes transaction information, transaction element dissimilarities, transaction dissimilarities, and information related to representative transactions.

The NTIR unit 73 then performs new-transaction information reading to read new transaction information from the NTIS unit 61, to pass it to the NTE unit 74, and to store it into the TIS unit 62 (step S72). The NTE unit 74 performs a new transaction evaluation to monitor a new transaction (step S73).

The MID unit 75 then performs monitoring information displaying to display a result of monitoring (step S74), and determines whether monitoring is to be finished (step S75). As a result, if monitoring is not to be finished, the transaction monitoring apparatus 2 goes back to step S72 to continue monitoring, in contrast, if monitoring is to be finished, the transaction monitoring apparatus 2 ends the processing.

Thus, by using an analysis result obtained by the transaction analyzing apparatus 1, a new transaction can be monitored and a processing state of the computer system for business can be easily ascertained.

Figure 25:
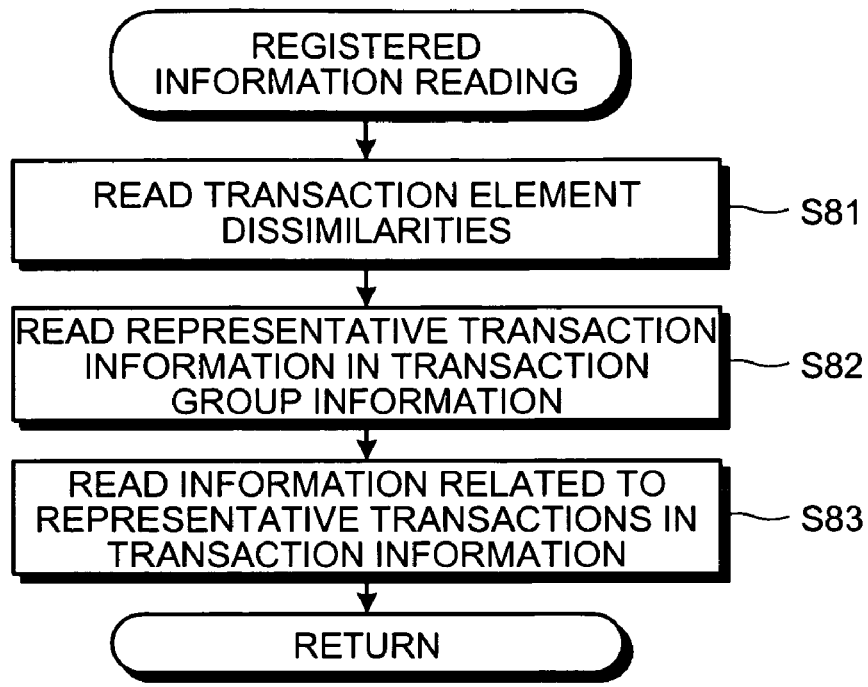
FIG. 25 is a flowchart of a processing procedure of registered-information reading shown in FIG. 24, when a new transaction is compared only with representative transactions.

Next, FIG. 25 is a flowchart of a processing procedure of the registered-information reading shown in FIG. 24, when a new transaction is compared only with representative transactions. As shown in FIG. 25, when comparing a new transaction only with the representative transactions, the RIS unit 72 reads transaction element dissimilarities from the TEDS unit 32 and stores them into the TEDS unit 63 (step S81).

Moreover, the RIS unit 72 reads information related to the representative transactions in the transaction group information from the TGIS unit 34, and stores them into the TGIS unit 64 (step S82); and reads information related to the representative transactions in the transaction information from the TIS unit 31, and stores them into the TIS unit 62 (step S83).

Thus, due to reading processing performed by the RIS unit 72, transactions can be monitored by using analysis result obtained by the transaction analyzing apparatus 1.

Figure 26:
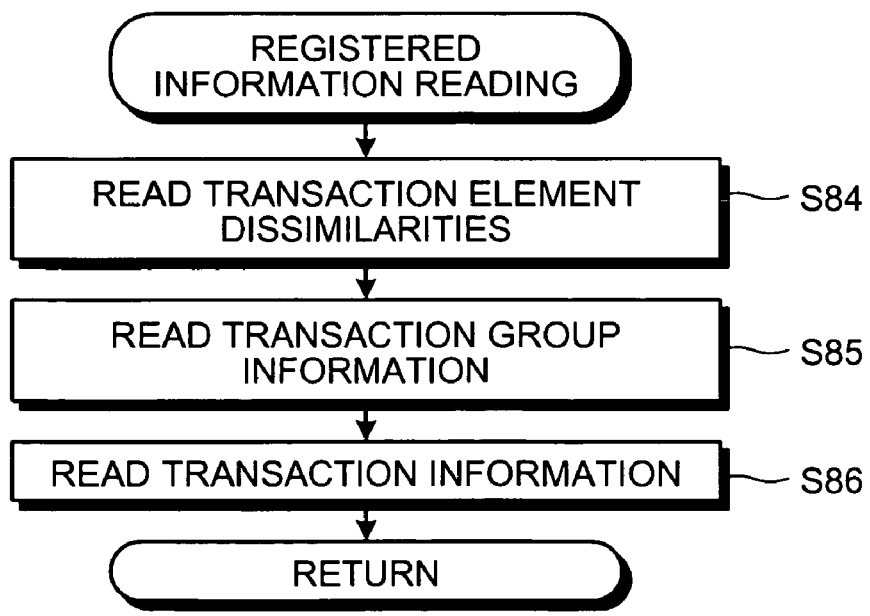
FIG. 26 is a flowchart of a processing procedure of the registered-information reading, when a new transaction is compared with both representative transactions and derivative transactions.

In contrast, FIG. 26 is a flowchart of a processing procedure of the registered-information reading, when a new transaction is compared with both representative transactions and derivative transactions. As shown in FIG. 26, when comparing a new transaction with both the representative transactions and the derivative transactions, the RIS unit 72 reads transaction element dissimilarities from the TEDS unit 32 and stores them into the TEDS unit 63 (step S84).

Moreover, the RIS unit 72 reads the transaction group information from the TGIS unit 34, and stores them into the TGIS unit 64 (step S85); and reads the transaction information from the TIS unit 31, and stores them into the TIS unit 62 (step S86).

Thus, as the RIS unit 72 reads information of all transactions including information related to the derivative transactions in addition to the representative transactions, a new transaction can be monitored based on comparison between the new transaction and the all transactions.

Figure 27:
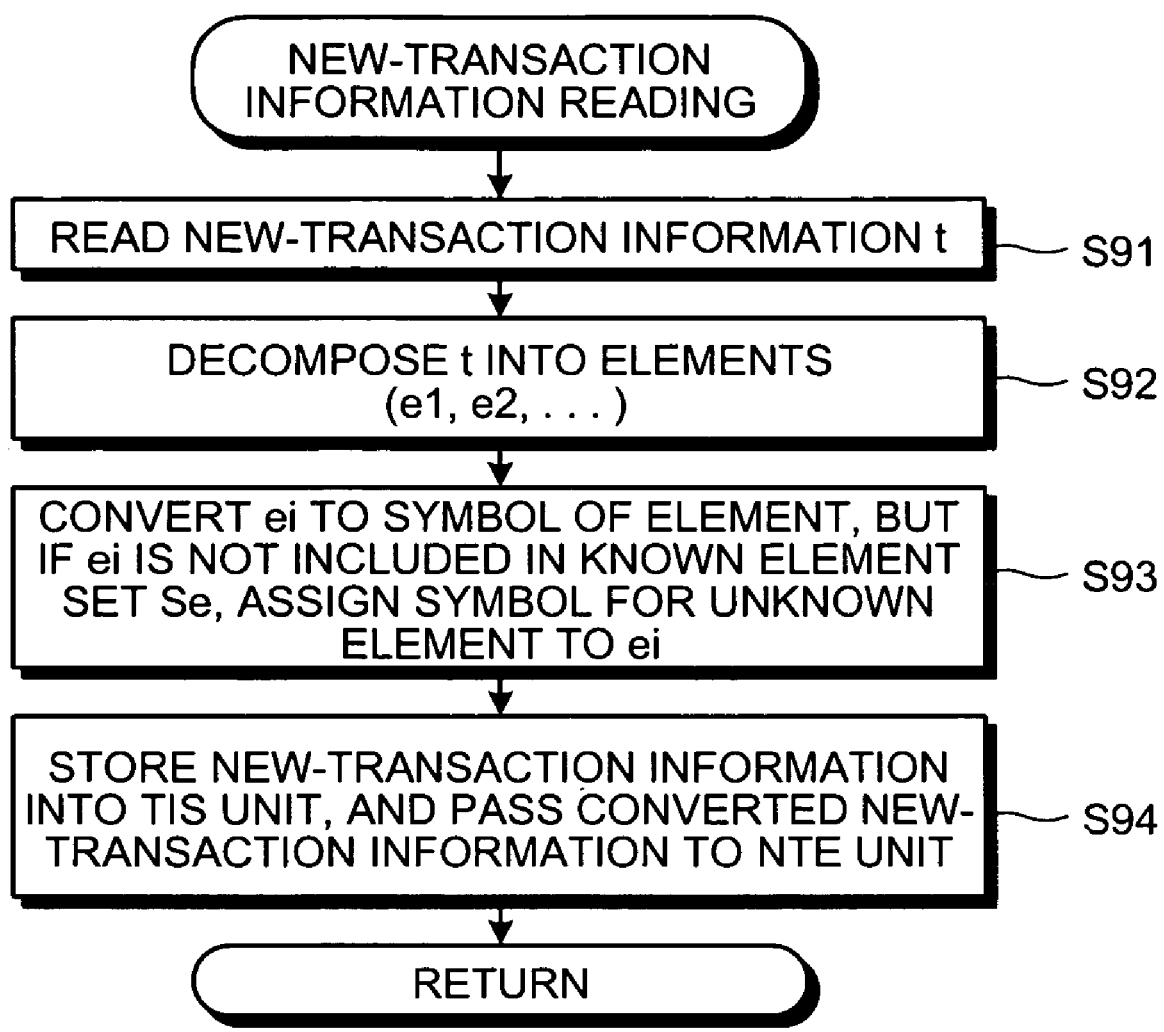
FIG. 27 is a flowchart of a processing procedure of new-transaction information reading shown in FIG. 24.

Next, FIG. 27 is a flowchart of a processing procedure of the new-transaction information reading shown in FIG. 24. As shown in FIG. 27, the NTIR unit 73 reads information of a new transaction t from the NTIS unit 61 (step S91), and decomposes the new transaction t into elements (e1, e2, . . . )(step S92).

The NTIR unit 73 then converts each element ei into a symbol by referring to element set information present in the TEDS unit 63. If any element is not included in the element set Se, such element is assigned with a symbol for an unknown element (step S93). The NTIR unit 73 then stores the new transaction information into the TIS unit 62, and passes converted new transaction information to the NTE unit 74 (step S94). If there is a new element, the NTIR unit 73 revises information in the TEDS unit 63.

Thus, due to the new-transaction information reading performed by the NTIR unit 73, the NTE unit 74 can monitor a new transaction.

Figure 28:
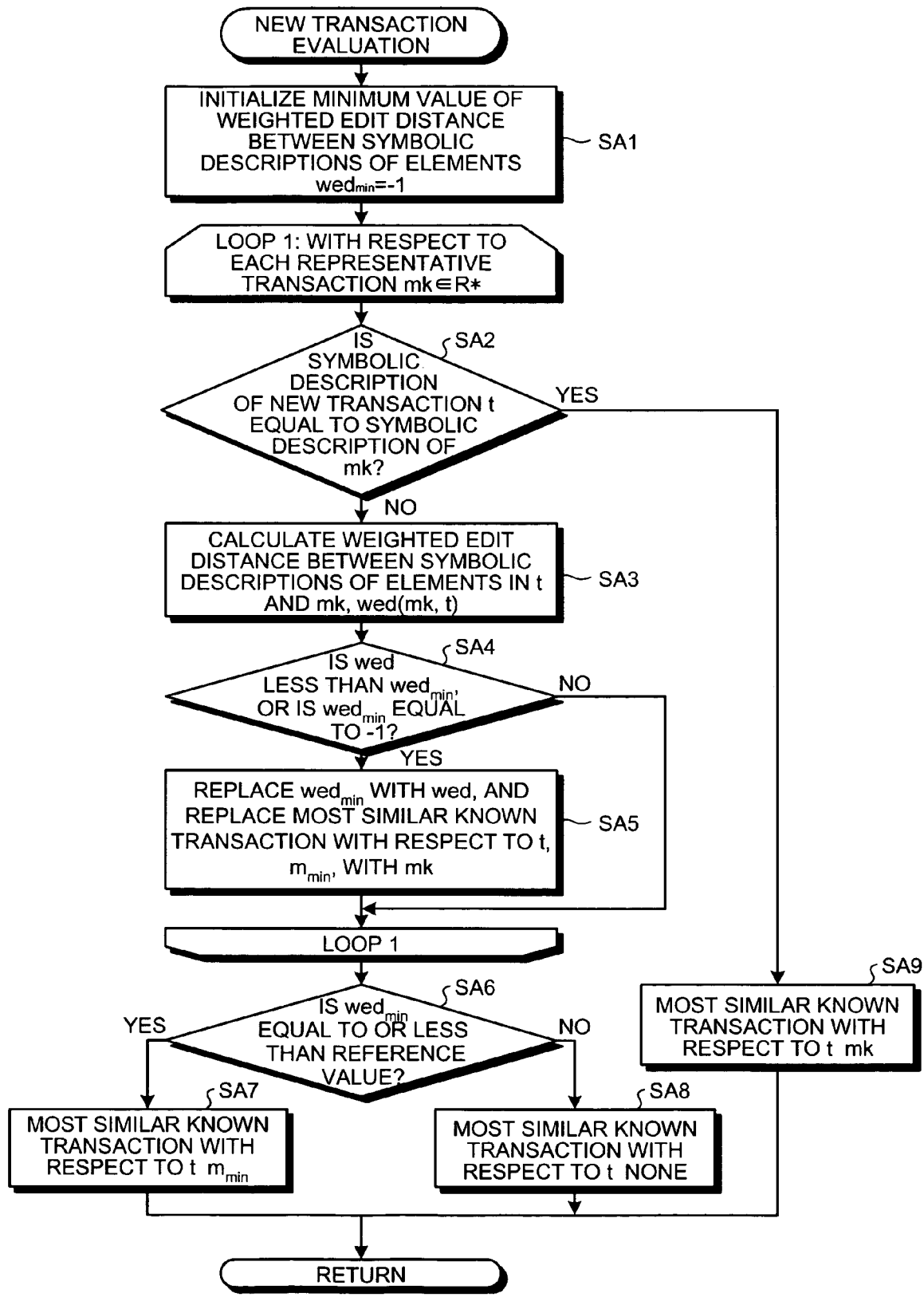
FIG. 28 is a flowchart of a processing procedure of new transaction evaluation shown in FIG. 24, when a new transaction is compared only with representative transactions.

Next, FIG. 28 is a flowchart of a processing procedure of the new transaction evaluation shown in FIG. 24, when a new transaction is compared only with the representative transactions.

As shown in FIG. 28, when comparing a new transaction only with the representative transactions, the NTE unit 74 initializes a minimum value of a weighted edit distance between symbolic descriptions of elements, $wed_{min}$, to "−1" (step SA1) at first, and then performs processing from steps SA2 to SA5 with respect to each representative transaction, mk∈R*. In this way, the NTE unit 74 obtains a minimum value of a weighted edit distance, $wed_{min}$, between a new transaction t and a representative transaction, and obtains the representative transaction as $m_{min}$ to the new transaction t at the moment.

Precisely, the NTE unit 74 determines whether a symbolic description of the new transaction t is equal to a symbolic description of a representative transaction mk (step SA2). If the symbolic description of the new transaction t is equal to the symbolic description of the representative transaction mk, mk is the most similar known transaction with respect to t (step SA9).

In contrast, if the symbolic description of the new transaction t is not equal to the symbolic description of the representative transaction mk, the NTE unit 74 calculates a weighted edit distance between mk and t, wed(mk, t), (step SA3), and compares wed(mk, t) with $wed_{min}$ (step SA4). As a result, if resultant wed is smaller than $wed_{min}$, or $wed_{min}$ is the initial value, $wed_{min}$ is replaced with wed, and the most similar known transaction with respect to t, $m_{min}$, is replaced with mk (step SA5).

In this way, renewed $wed_{min}$ and renewed $m_{min}$ are obtained, and then the renewed $wed_{min}$ is compared with a reference value (step SA6). If the renewed $wed_{min}$ is equal to or less than the reference value, the NTE unit 74 determines that a most similar known transaction with respect to t is the renewed $m_{min}$ (step SA7). If the renewed $wed_{min}$ is more than the reference value, the NTE unit 74 determines that there is no most similar known transaction with respect to t (step SA8).

Thus, the NTE unit 74 compares a new transaction with respect to each representative transaction, and determines that there is no similar known transaction to the new transaction if a minimum value of wed is not more than a reference value, thereby discovering an exceptional transaction.

Figure 29:
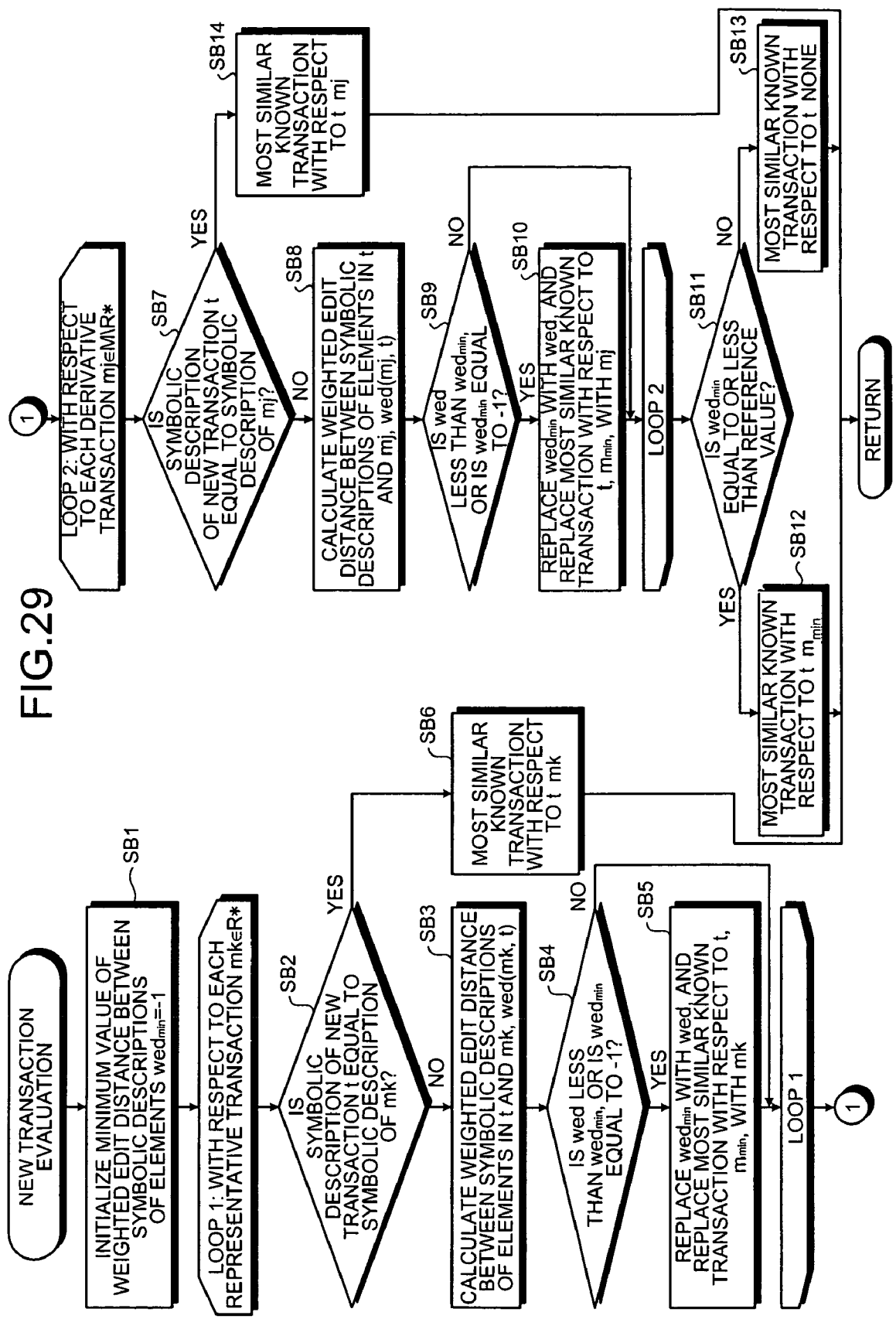
FIG. 29 is a flowchart of a processing procedure of the new transaction evaluation, when a new transaction is compared with both representative transactions and derivative transactions.

FIG. 29 is a flowchart of a processing procedure of the new transaction evaluation, when a new transaction is compared with both representative transactions and derivative transactions. As shown in FIG. 29, when monitoring a new transaction with both representative transactions and derivative transactions, the NTE unit 74 initializes a minimum value of a weighted edit distance between symbolic descriptions of elements, $wed_{min}$, to "−1" (step SB1) at first, and then performs processing from steps SB2 to SB5 with respect to each representative transaction, mk∈R*. In this way, the NTE unit 74 obtains a minimum value of a weighted edit distance, $wed_{min}$, between a new transaction t and a representative transaction, and obtains the representative transaction as $m_{min}$ to the new transaction t at the moment.

Precisely, the NTE unit 74 determines whether a symbolic description of the new transaction t is equal to a symbolic description of a representative transaction mk (step SB2). If the symbolic description of the new transaction t is equal to the symbolic description of the representative transaction mk, mk is the most similar known transaction with respect to t (step SB6).

In contrast, if the symbolic description of the new transaction t is not equal to the symbolic description of the representative transaction mk, the NTE unit 74 calculates a weighted edit distance between mk and t, wed(mk, t), (step SB3), and compares wed(mk, t) with $wed_{min}$ (step SB4). As a result, if resultant wed is smaller than $wed_{min}$, or $wed_{min}$ is the initial value, $wed_{min}$ is replaced with wed, and the most similar known transaction with respect to t, $m_{min}$, is replaced with mk (step SB5)

In this way, a renewed $wed_{min}$ and a renewed $m_{min}$ are obtained, and then the NTE unit 74 performs processing from steps SB7 to SB10 with respect to each derivative transaction, mj∈M\R*, similarly to the processing for the representative transactions. In this way, the NTE unit 74 obtains a minimum value of a weighted edit distance, $wed_{min}$, between the new transaction t and a transaction, and obtains the transaction as $m_{min}$ to the new transaction at the moment.

Precisely, the NTE unit 74 determines whether the symbolic description of the new transaction t is equal to a symbolic description of a derivative transaction mj (step SB7). If the symbolic description of the new transaction t is equal to the symbolic description of the derivative transaction mj, mj is the most similar known transaction with respect to t (step SB14).

In contrast, if the symbolic description of the new transaction t is not equal to the symbolic description of the derivative transaction mj, the NTE unit 74 calculates a weighted edit distance between mj and t, wed(mj, t), (step SB8), and compares wed(mj, t) with $wed_{min}$ (step SB9). As a result, if resultant wed is smaller than $wed_{min}$, $wed_{min}$ is replaced with wed, and the most similar known transaction with respect to t, $m_{min}$, is replaced with mj (step SB10)

In this way, a further renewed $wed_{min}$ and a further renewed $m_{min}$ are obtained, and then $wed_{min}$ is compared with the reference value (step SB11). If $wed_{min}$ is equal to or less than the reference value, the NTE unit 74 determines that the most similar known transaction with respect to t is min (step SB12). If $wed_{min}$ is more than the reference value, the NTE unit 74 determines that there is no most similar known transaction with respect to t (step SB13).

Thus, the NTE unit 74 compares a new transaction with all transactions, and determines that there is no similar known transaction to the new transaction if a minimum value of wed is more than a reference value, there by discovering an exceptional transaction.

Figure 30:
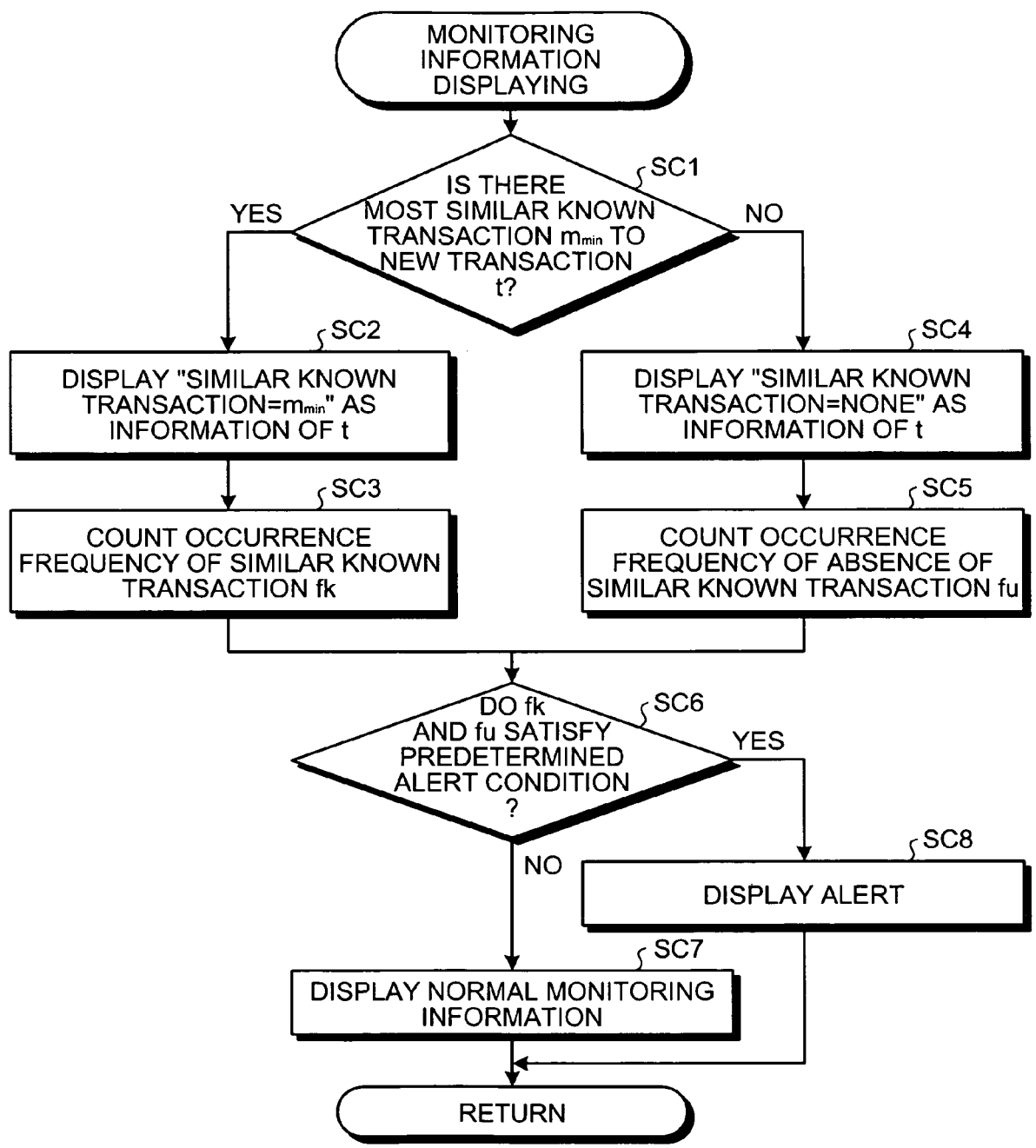
FIG. 30 is a flowchart of a processing procedure of monitoring information displaying shown in FIG. 24.

Next, FIG. 30 is a flowchart of a processing procedure of the monitoring information displaying shown in FIG. 24. As shown in FIG. 30, the MID unit 75 determines whether there is a most similar known transaction $m_{min}$ to a new transaction t. (step SC1).

As a result, if there is a most similar known transaction $m_{min}$, the MID unit 75 displays a "similar known transaction=$m_{min}$" as information of t (step SC2), and add "1" to fk, an occurrence frequency of similar known transaction (step SC3).

In contrast, if there is not a most similar known transaction $m_{min}$ the MID unit 75 displays "no similar known transaction" as information of t (step SC4), and add "1" to fu, an occurrence frequency of no similar known transaction (step SC5).

The MID unit 75 then determines whether fk and fu satisfy a predetermined alert condition, for example, whether fu/fk is equal to 0.05 or more as shown in FIG. 23 (step SC6). If fk and fu do not satisfy the predetermined alert condition, the MID unit 75 displays normal monitoring information (step SC7). In contrast, if fk and fu satisfy the predetermined alert condition, the MID unit 75 displays an alert (step SC8).

Thus, due to the monitoring information displayed by the MID unit 75 based on the monitoring results obtained by the NTE unit 74, a user can easily monitor a processing state of a computer system for business.

In the above example according to the second embodiment, the transaction monitoring apparatus 2 evaluates and monitors individual new transactions, however, the computer system can be monitored based on an appearance frequency of a transaction. Another example will be explained below in a case where the transaction monitoring apparatus 2 selects a representative transaction that has an appearance frequency within a reference range as a subject transaction to be monitored, and monitors the computer system based on the appearance frequency of selected representative transaction.

Figure 31:
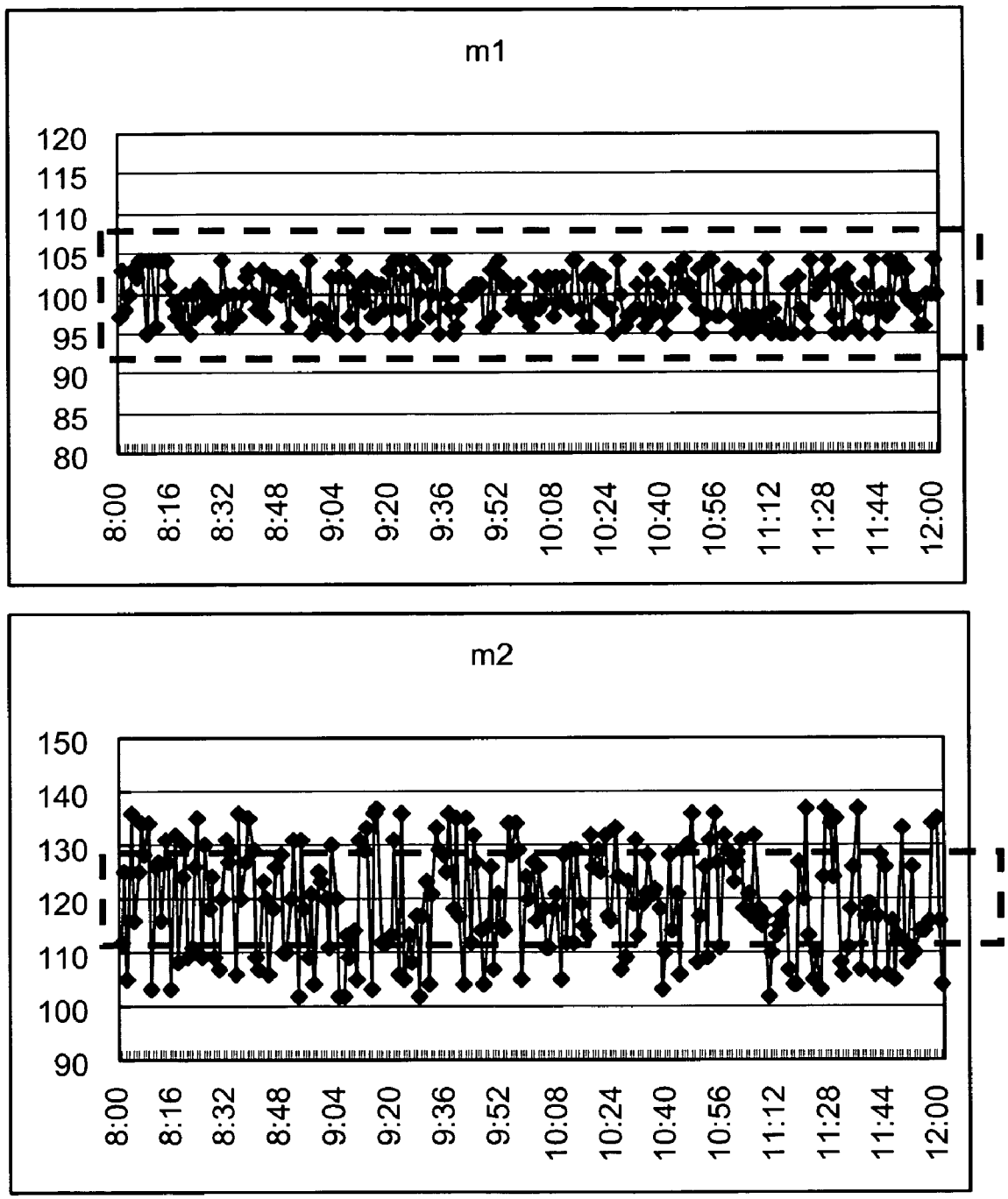
FIG. 31 is an example of graphs indicating criteria for representative transactions subjected to monitoring according to the second embodiment.

FIG. 31 is an example graphs indicating criteria for a representative transaction subjected to monitoring. FIG. 31 presents a case where a representative transaction is selected as a transaction subjected to monitoring, if an appearance frequency per unit time of the representative transaction is within a reference range during a certain period provided for selecting representative transactions subjected to monitoring (hereinafter, "selecting period").

For example, where the reference range is set between ±8% of an average of appearance frequency per unit time during the selecting period, the transaction m1 is selected as a transaction subjected to monitoring because appearance frequencies of the transaction m1 are within the reference range during the selecting period (range delimited with broken lines in FIG. 31), while the transaction m2 is excluded from transactions subjected to monitoring because appearance frequencies of the transaction m2 are not within the reference range during the selecting period.

Figure 32:
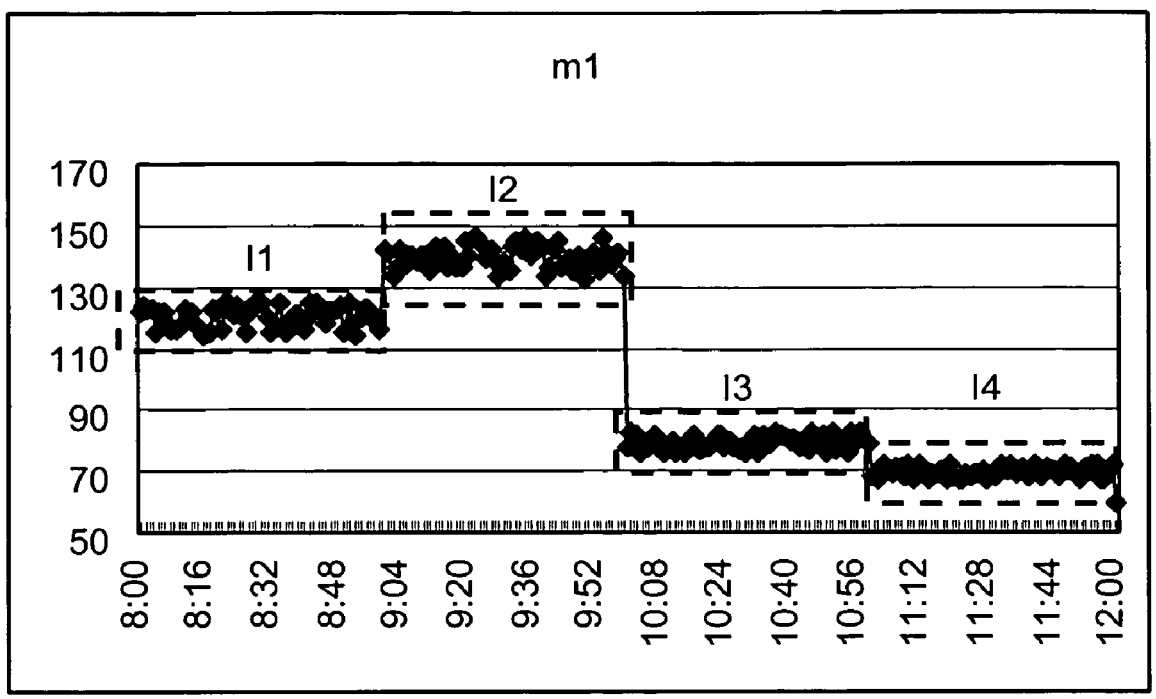
FIG. 32 is an example of a graph indicating reference ranges being changed in accordance with a time zone according to the second embodiment.

In another example, a reference range can be changed in accordance with a time zone, such as: between 8 to 9 o'clock, between 9 to 10 o'clock, and so on; morning, afternoon, and evening; or weekday and holiday. FIG. 32 is an example of a graph of indicating a reference range being changed in accordance with a time zone. In FIG. 32, an average of appearance frequency per unit time is calculated for each of time zones I1, I2, and so on, and each reference range is set between ±k % of the average in each time zone. In still another example, a reference range can be set such that a change rate of appearance frequency from j-th unit time to (j+1)th unit time should be between ±m %.

Furthermore, the transaction monitoring apparatus 2 can determine whether an alert is to be issued based on a proportion of appearances of a specific opening message in representative transactions subjected to monitoring.

Figure 33:
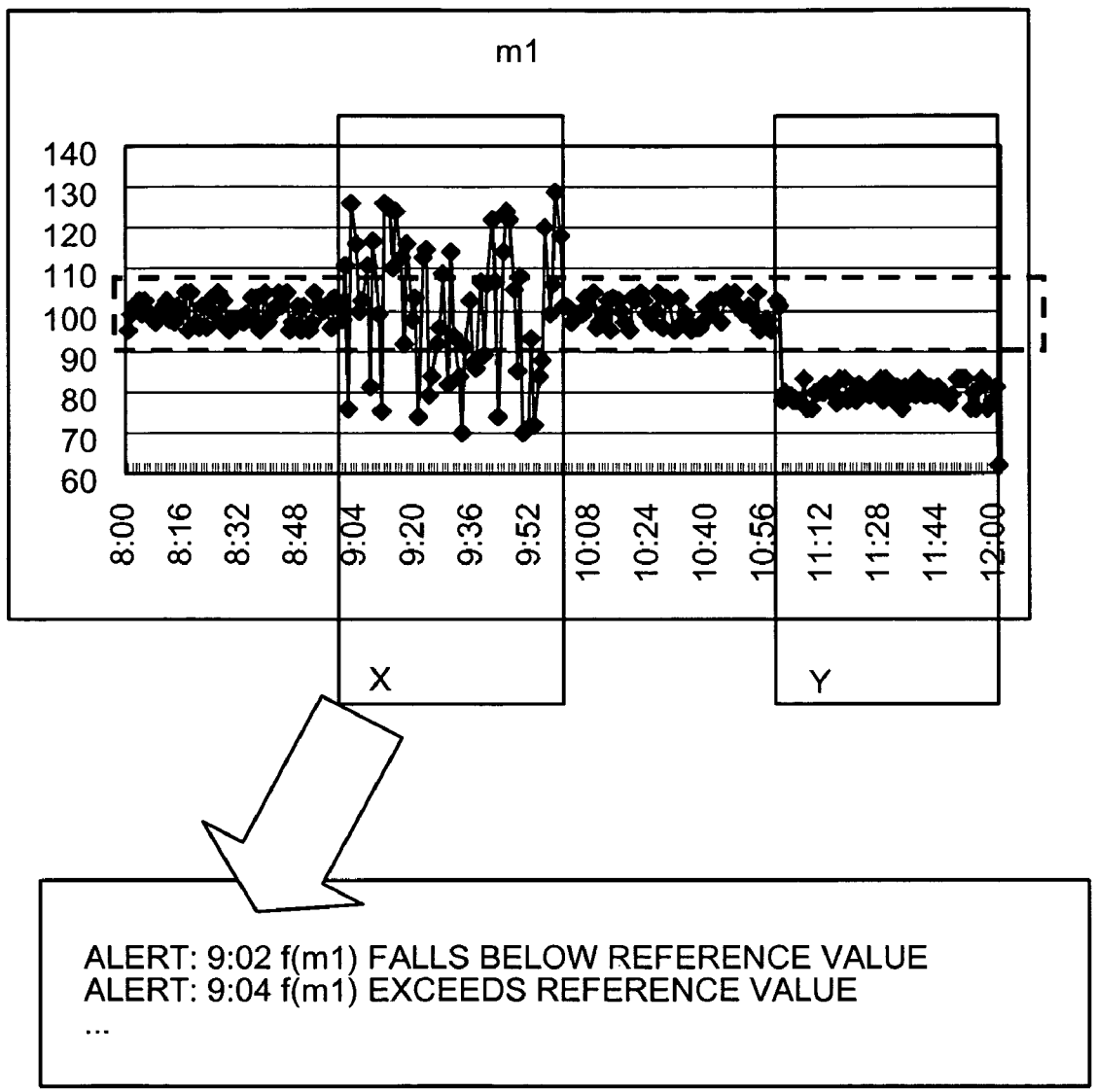
FIG. 33 a schematic for explaining an example of monitoring a representative transaction m1 subjected to monitoring according to the second embodiment.

FIG. 33 a schematic for explaining an example of monitoring the representative transaction m1 subjected to monitoring shown in FIG. 31. The transaction monitoring apparatus 2 monitors an appearance frequency of the representative transaction m1 per unit time, f(m1), among newly observed transactions. In this example, an alert is displayed, because f(m1) departs during periods X and Y in FIG. 31.

In this example, only m1 is displayed as the representative transaction subjected to monitoring, however, a plurality of transactions can be selected as a representative transaction subjected to monitoring.

Figure 34:
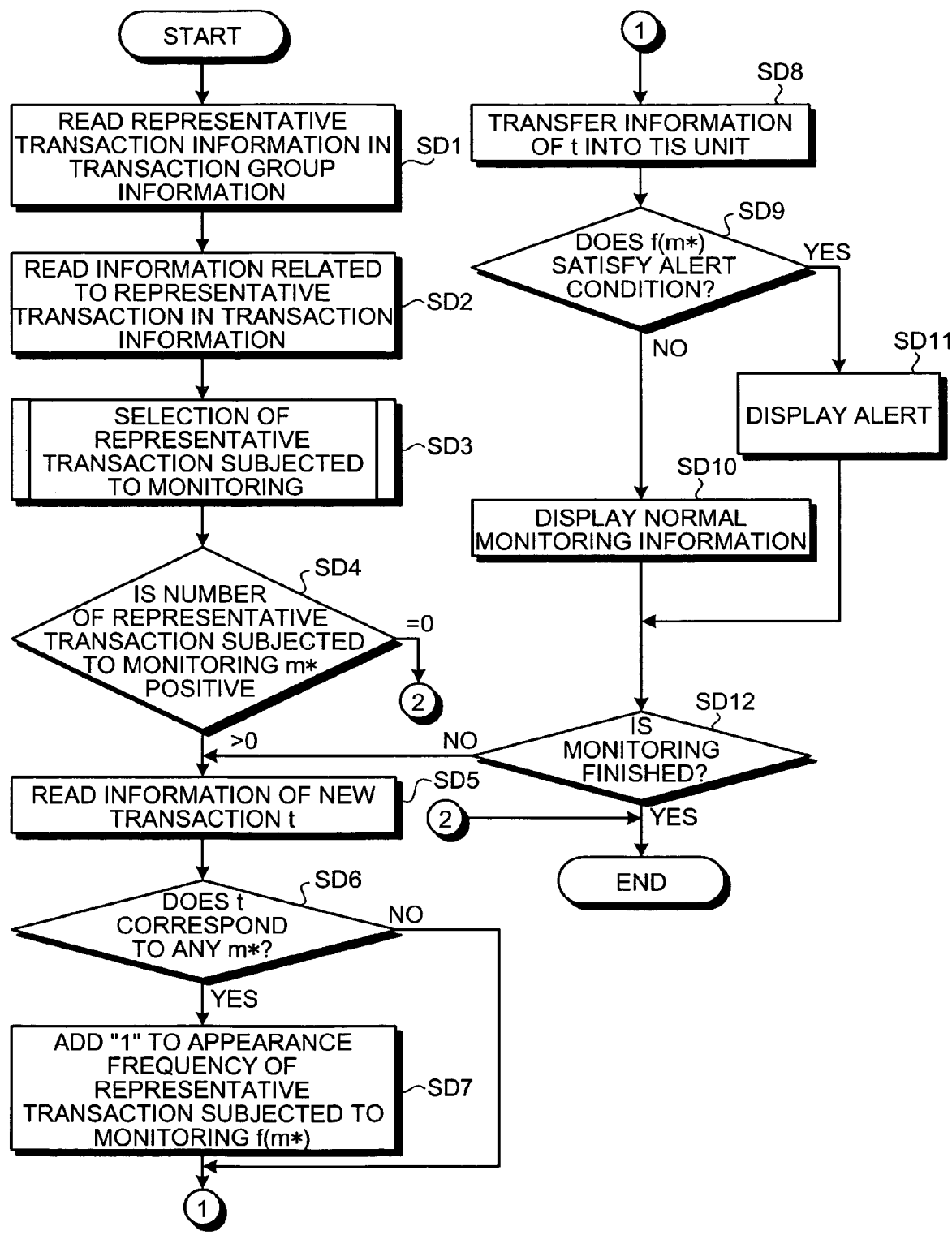
FIG. 34 is a flowchart of a processing procedure of monitoring representative transactions subjected to monitoring according to the second embodiment.

Next, FIG. 34 is a flowchart of a processing procedure of monitoring representative transactions subjected to monitoring.

As shown in FIG. 34, at the monitoring, the RIS unit 72 reads information related to the representative transactions in the transaction group information, and stores read information into the TGIS unit 64 (step SD1); and reads information related to the representative transaction in the transaction information, and stores read information into the TIS unit 62 (step SD2).

The NTE unit 74 then performs selection of representative transaction subjected to monitoring to select a representative transaction subjected to monitoring (step SD3). The NTE unit 74 then determines whether the number of representative transaction subjected to monitoring, m*, is positive, i.e., determines presence or absence of representative transaction subjected to monitoring (step SD4). As a result, if the number of m* is "0", which means that no representative transaction subjected to monitoring is selected, the transaction monitoring apparatus 2 ends monitoring.

In contrast, if the number of m* is positive, the NTIR unit 73 reads a new transaction t (step SD5), and passes the new transaction to the NTE unit 74. The NTE unit 74 then determines whether t corresponds to any m* (step SD6). As a result, if t corresponds to an m*, the NTE unit 74 adds "1" to f(m*), an appearance frequency of the representative transaction subjected to monitoring (step SD7)

The NTIR unit 73 then transfers information of t into the TIS unit 62 (step SD8). The NTE unit 74 determines whether f(m*) satisfies an alert condition, i.e., f(m*) departs from a reference range (step SD9). If f(m*) does not satisfy the alert condition, the MID unit 75 displays normal monitoring information (step SD10). If f(m*) satisfies the alert condition, the MID unit 75 displays an alert (step SD11).

The MID unit 75 then determines whether monitoring is finished. If monitoring is not finished, the transaction monitoring apparatus 2 goes back to step SD5 to process a next new transaction. If monitoring is finished, the transaction monitoring apparatus 2 ends monitoring.

Thus, an appearance frequency of a representative transaction selected to be monitored is counted, and an alert is displayed if the appearance frequency satisfies a predetermined alert condition, thereby monitoring a processing state of a computer system for business.

Figure 35:
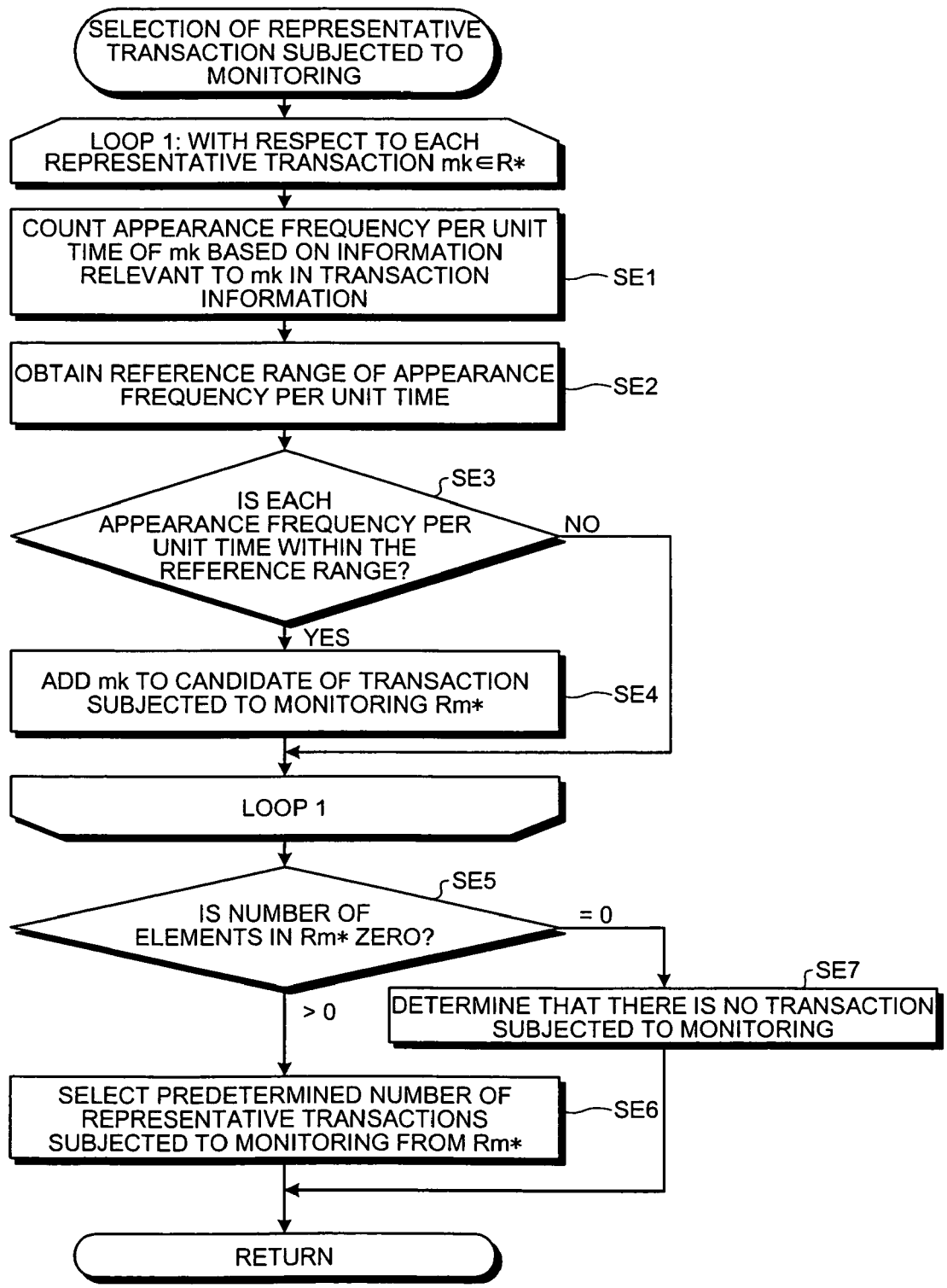
FIG. 35 is a flowchart of processing procedure of selection of representative transaction subjected to monitoring shown in FIG. 34.

Next, FIG. 35 is a flowchart of processing procedure of the selection of representative transaction subjected to monitoring shown in FIG. 34. As shown in FIG. 34, in the selection of representative transaction subjected to monitoring, the NTE unit 74 performs the following steps SE1 to SE4 on each representative transaction, mkϵR*, to select a representative transaction subjected to monitoring.

Precisely, the NTE unit 74 counts an appearance frequency per unit time of mk based on information relevant to mk in the transaction information present in the TIS unit 62 (step SE1), and obtains a reference range of appearance frequency per unit time (step SE2).

The NTE unit 74 then determines whether each appearance frequency per unit time is within the reference range (step SE3). If the each appearance frequency is within the reference range, the NTE unit 74 adds mk to $R_{m*}$, a candidate set of transaction subjected to monitoring (step SE4).

After finishing selection of a representative transaction subjected to monitoring, the NTE unit 74 determines whether the number of elements in $R_{m*}$ is "0" (step SE5). If the number of elements is not "0", the NTE unit 74 selects a predetermined number of representative transactions subjected to monitoring from Rm. (step SE6). If the number of element is "0", the NTE unit 74 determines that there is no transaction subjected to monitoring (step SE7).

Thus, according to the second embodiment, the NTE unit 74 evaluates a new transaction using representative transactions. Therefore, the transaction monitoring apparatus 2 can appropriately monitor a processing state of the computer system for business based on the analysis result obtained by the transaction analyzing apparatus 1.

In the above examples according to the second embodiment, the transaction monitoring apparatus 2 that monitors transactions is provided as a separate apparatus different from the transaction analyzing apparatus 1 that analyzes transactions. However, the present invention is not limited to this, but also can be applied to a transaction analyzing apparatus or a transaction monitoring apparatus that combines an analyzing function of the transaction analyzing apparatus 1 and a monitoring function of the transaction monitoring apparatus 2.

Moreover, in the above examples according to the second embodiment, the transaction monitoring apparatus 2 monitors transactions based on an analysis result obtained by the transaction analyzing apparatus 1. However, when the number of new transactions reaches a certain value while monitoring, or when a certain period passes, the transaction analyzing apparatus 1 can again performs an analysis on transactions including new transactions, and the transaction monitoring apparatus 2 can monitor transactions based on a new result.

Configuration of the transaction analyzing apparatus explained according to the first and the transaction monitoring apparatus explained according to the second embodiment can be achieved by software, and a transaction-analyzing computer program and a transaction-monitoring computer program that have respective similar functions can be obtained.

Figure 36:
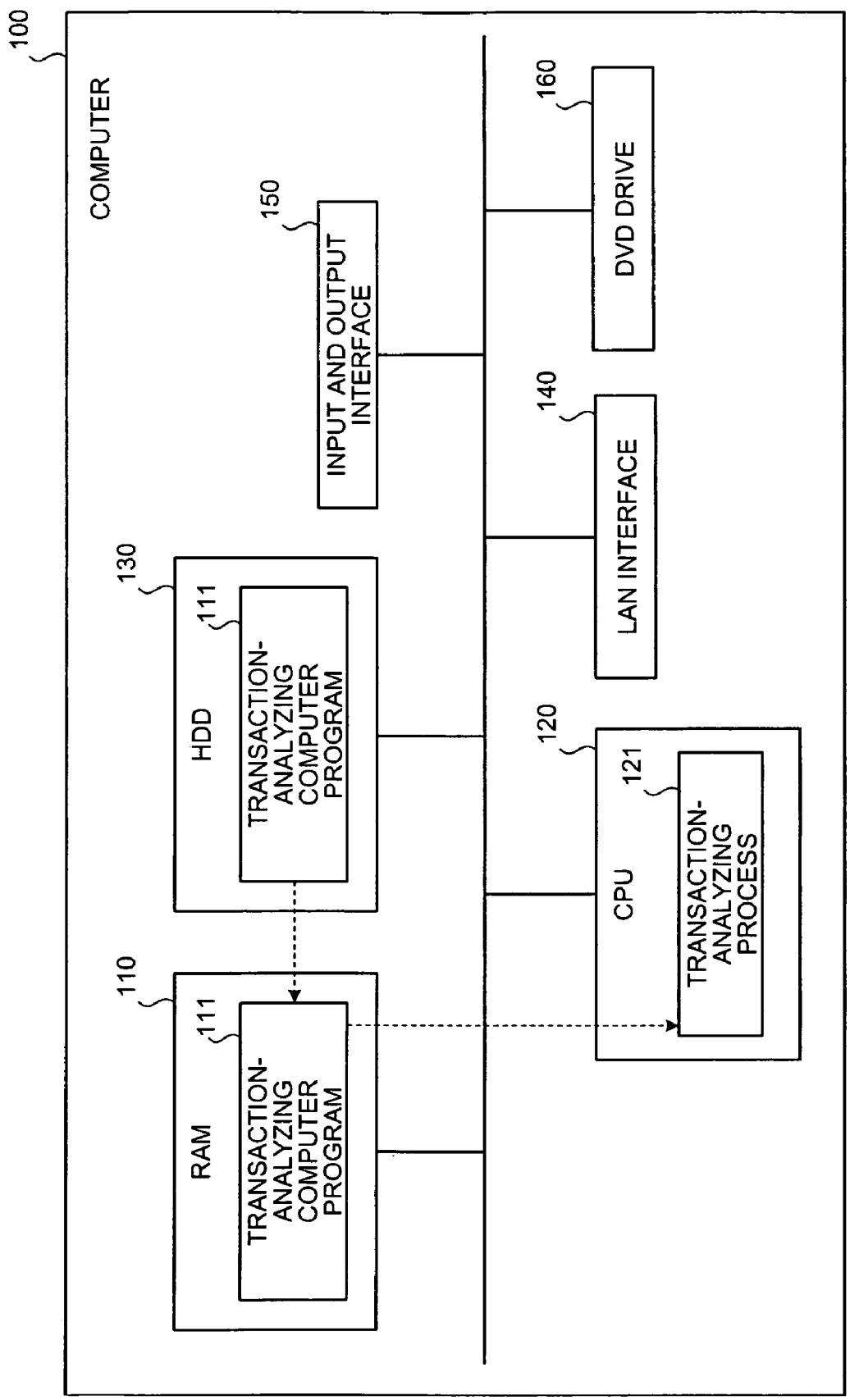
FIG. 36 is a functional block diagram of a computer that executes a transaction-analyzing computer program according to the first embodiment.

FIG. 36 is a functional block diagram of a computer that executes a transaction-analyzing computer program according to the first embodiment. As shown in FIG. 36, a computer 100 includes a random access memory (RAM) 110, a central processing unit (CPU) 120, a hard disk drive (HDD) 130, a local area network (LAN) interface 140, an input and output interface 150, and a digital versatile disc (DVD) drive 160.

The RAM 110 is a memory that stores there in a computer program and an intermediate result of an executed computer program. The CPU 120 is a central processing unit that reads a computer program from the RAM 110 to execute the computer program.

The HDD 130 is a disk drive device that stores therein a computer program and data. The LAN interface 140 is an interface to connect the computer 100 to another computer via a LAN.

The input and output interface 150 is an interface to connect an input interface, such as a mouse or a keyboard, and a display device. The DVD drive 160 is a device that reads from and writes on a DVD.

A transaction-analyzing computer program 111 that is executed by the computer 100 is present in a DVD, read out by the DVD drive 160 from the DVD, and installed onto the computer 100.

Alternatively, the transaction-analyzing computer program 111 can be stored in a database on another computer connected via the LAN inter face 140, and then read out from such database and installed onto the computer 100.

Installed transaction-analyzing computer program 111 is stored in the HDD 130, read out by the RAM 110, executed by the CPU 120 as a transaction-analyzing process 121.

In the example of the first embodiment, the analysis of transactions in a computer system for business is explained, however, the present invention is not limited to this, but also can be applied to an analysis of processing state of a computer system that includes a plurality of types of units of processing.

By using the computer program according to the embodiments of the present invention, a processing state of a computer system can be easily ascertained, even when the computer system processes numerous units of processing.

Moreover, units of processing can be appropriately grouped.

Furthermore, a user can obtain information appropriate to a purpose of analysis.

Moreover, workload on the computer system for monitoring the computer system itself can be reduced.

Furthermore, the computer system can be monitored efficiently.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable medium that stores therein a computer program that causes a computer to analyze a processing state of a computer system that includes a plurality of types of a unit of processing, wherein the computer program causes the computer to execute:

selecting a plurality of representative units of processing based on a weighted edit distance between individual units of the unit of processing, the unit of processing including one of protocol types that indicate protocol information, an edit distance between a first string: p and a second string: q being a number of minimum operations to be performed on the first string: p to correspond the first string: p with the second string: q, the weighted edit distance ed(p, q) being defined as:

ed(p, q)=(edit distance between p and q)/(sum of string lengths of p and q), when p and q use a same protocol, the weighted edit distance ed(p, q) being defined as:

ed(p, q)=(constant value), when p and q use different protocols from each other;

grouping each unit of processing based on the weighted edit distance between the each unit of processing and each representative unit of processing selected at the selecting; and monitoring a processing state of the computer system using at least one of the representative units of processing selected at the selecting.

2. The computer-readable medium according to claim 1, wherein
the computer system is a computer system for a business,
the unit of processing is a transaction, and
elements that constitute the transaction include a protocol type that indicates protocol information.

3. The computer-readable medium according to claim 2, wherein
the computer system is a web service system that provides web-based services, and
the protocol information is information related to a protocol belonging to a layer of a plurality of layers associated with the web-based service.

4. The computer-readable medium according to claim 3, wherein the plurality of layers include a web server layer, an application server layer, and a database server layer.

5. The computer-readable medium according to claim 1, wherein the selecting includes selecting a group of representative units of processing so as to minimize a total sum of edit distances in a unit of processing set between each unit of processing and a most similar representative unit of processing to the each unit of processing.

6. The computer-readable medium according to claim 1, wherein the computer program further causes the computer to execute:
displaying a grouping result obtained at the grouping, wherein
the displaying includes displaying a summary that presents information related to a representative unit of processing, and displaying details that present information related to another unit of processing in addition to the representative unit of processing.

7. The computer-readable medium according to claim 1, wherein the monitoring includes monitoring the processing state of the computer system based on the weighted edit distance between a new unit of processing newly processed by the computer system and each representative unit of processing selected at the selecting.

8. The computer-readable medium according to claim 1, wherein the monitoring includes monitoring the processing state of the computer system based on a grouping result obtained at the grouping.

9. The computer-readable medium according to claim 8, wherein the monitoring includes monitoring the processing state of the computer system based on an occurrence frequency of a unit of processing that belongs to none of unit of processing groups obtained at the grouping.

10. The computer-readable medium according to claim 9, wherein the monitoring includes monitoring the processing state of the computer system based on a ratio between the occurrence frequency of the unit of processing that belongs to none of the unit of processing groups obtained at the grouping, and an occurrence frequency of another unit of processing that belongs to any one of the unit of processing groups.

11. The computer-readable medium according to claim 1, wherein the monitoring includes issuing an alert, if an occurrence frequency per unit time of a representative unit of processing that is within a reference range during a selecting period departs from the reference range during a monitoring period.

12. The computer-readable medium according to claim 11, wherein the reference range varies in accordance with a time zone.

13. The computer-readable medium according to claim 1, wherein
the selecting is re-executed every time a number of new units of processing newly processed by the computer system reaches a certain number, and
the monitoring includes monitoring a processing state of the computer system based on a representative unit of processing newly selected if the selecting is re-executed.

14. A method of analyzing a processing state of a computer system that includes a plurality of types of a unit of processing, the method comprising:
selecting a plurality of representative units of processing, using a processor, based on a weighted edit distance between individual units of the unit of processing, the unit of processing including one of protocol types that indicate protocol information, an edit distance between a first string: p and a second string: q being a number of minimum operations to be performed on the first string: p to correspond the first string: p with the second string: q, the weighted edit distance ed(p, q) being defined as:
ed(p, q)=(edit distance between p and q)/(sum of string lengths of p and q), when p and q use a same protocol,
the weighted edit distance ed(p, q) being defined as:
ed(p, q)=(constant value), when p and q use different protocols from each other;
grouping each unit of processing based on the weighted edit distance between the each unit of processing and each representative unit of processing selected at the selecting; and
monitoring a processing state of the computer system using at least one of the representative units of processing selected at the selecting.

15. A system analyzing apparatus comprising:
a processor configured to execute a procedure, the procedure comprising:
selecting a plurality of representative units of processing based on a weighted edit distance between individual units of a unit of processing, the unit of processing including one of protocol types that indicate protocol information, an edit distance between a first string: p and a second string: q being a number of minimum operations to be performed on the first string: p to correspond the first string: p with the second string: q;
grouping each unit of processing based on the weighted edit distance between the each unit of processing and each representative unit of processing selected by the selecting, the weighted edit distance ed(p, q) being defined as:
ed(p, q)=(edit distance between p and q)/(sum of string lengths of p and q), when p and q use a same protocol,
the weighted edit distance ed(p, q) being defined as:
ed(p, q)=(constant value), when p and q use different protocols from each other; and
monitoring a processing state of the computer system using at least one of the representative units of processing selected at the selecting.

16. The computer-readable medium according to claim 1, wherein the operations to be performed on the first string include at least one of insertion, deletion and replacement of a character.

* * * * *